(12) United States Patent
Matsumoto et al.

(10) Patent No.: US 8,368,391 B2
(45) Date of Patent: Feb. 5, 2013

(54) STROKE SENSOR AND ROTATION ANGLE SENSOR

(75) Inventors: Koichiro Matsumoto, Kariya (JP); Tetsuya Aoki, Chita-gun (JP); Takashi Kawashima, Nagoya (JP); Tatsuya Kitanaka, Nagoya (JP); Yoshiyuki Kono, Obu (JP)

(73) Assignee: Denso Corporation, Kariya (JP)

( * ) Notice: Subject to any disclaimer, the term of this patent is extended or adjusted under 35 U.S.C. 154(b) by 530 days.

(21) Appl. No.: 12/694,628

(22) Filed: Jan. 27, 2010

(65) Prior Publication Data
US 2010/0188074 A1    Jul. 29, 2010

(30) Foreign Application Priority Data

Jan. 29, 2009  (JP) .................................. 2009-17870
Aug. 26, 2009  (JP) ................................ 2009-195255

(51) Int. Cl.
*G01B 7/14*      (2006.01)
(52) U.S. Cl. ................................................ 324/207.24
(58) Field of Classification Search .............. 324/207.24
See application file for complete search history.

(56) References Cited

U.S. PATENT DOCUMENTS

| | | |
|---|---|---|
| 6,211,668 B1 | 4/2001 | Deusler et al. |
| 6,340,908 B1 | 1/2002 | Matuyama |
| 7,162,355 B2 | 1/2007 | Yoda et al. |
| 7,285,952 B1 | 10/2007 | Hatanaka et al. |
| 7,355,388 B2 | 4/2008 | Ishio |
| 7,893,688 B2 * | 2/2011 | Kawashima et al. .... 324/207.24 |
| 2003/0112006 A1 * | 6/2003 | Luetzow ................... 324/207.21 |
| 2009/0033315 A1 | 2/2009 | Kawashima et al. |

FOREIGN PATENT DOCUMENTS

| | | |
|---|---|---|
| JP | 2001-91298 | 4/2001 |
| JP | 2005-180483 | 7/2005 |
| JP | 2007-132710 | 5/2007 |

OTHER PUBLICATIONS

Japanese Office Action dated Jan. 11, 2011, issued in corresponding Japanese Application No. 2009-195255 with English Translation.
Japanese Office Action dated Jan. 17, 2012, issued in corresponding Japanese Application No. 2009-195255 with English Translation.
U.S. Appl. No. 12/181,783, Kawashima et al., filed Jul. 29, 2008.

\* cited by examiner

*Primary Examiner* — Reena Aurora
(74) *Attorney, Agent, or Firm* — Nixon & Vanderhye PC

(57) ABSTRACT

A stroke sensor has two magnets, which are magnetized in a cross-section direction and are displaced in a longitudinal direction, and two magnetism sensitive sections arranged parallel to the longitudinal direction. The magnets have circular-arc-shaped swelling end edges respectively and are magnetized such that the swelling end edges have opposite polarities. Thus, a distribution of a magnetic flux density on an arrangement axis substantially coincides with a sine curve. The magnetic flux having such the distribution is displaced in the longitudinal direction together with the magnets. The magnetism sensitive sections are arranged on the arrangement axis to be distant from each other by a distance of one fourth of a cycle of the sine curve. Thus, the stroke sensor that is not affected by temperature and that has high sensing accuracy can be provided.

20 Claims, 22 Drawing Sheets

FIG. 7A
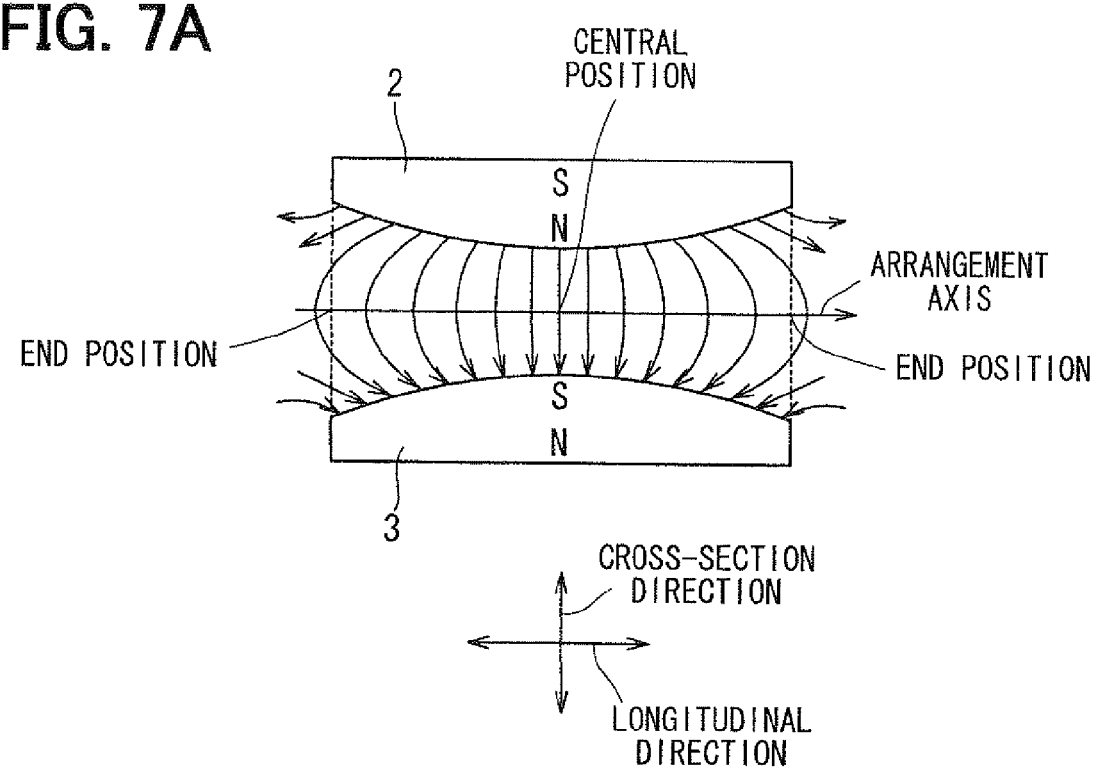
FIG. 7B COMPARATIVE EXAMPLE
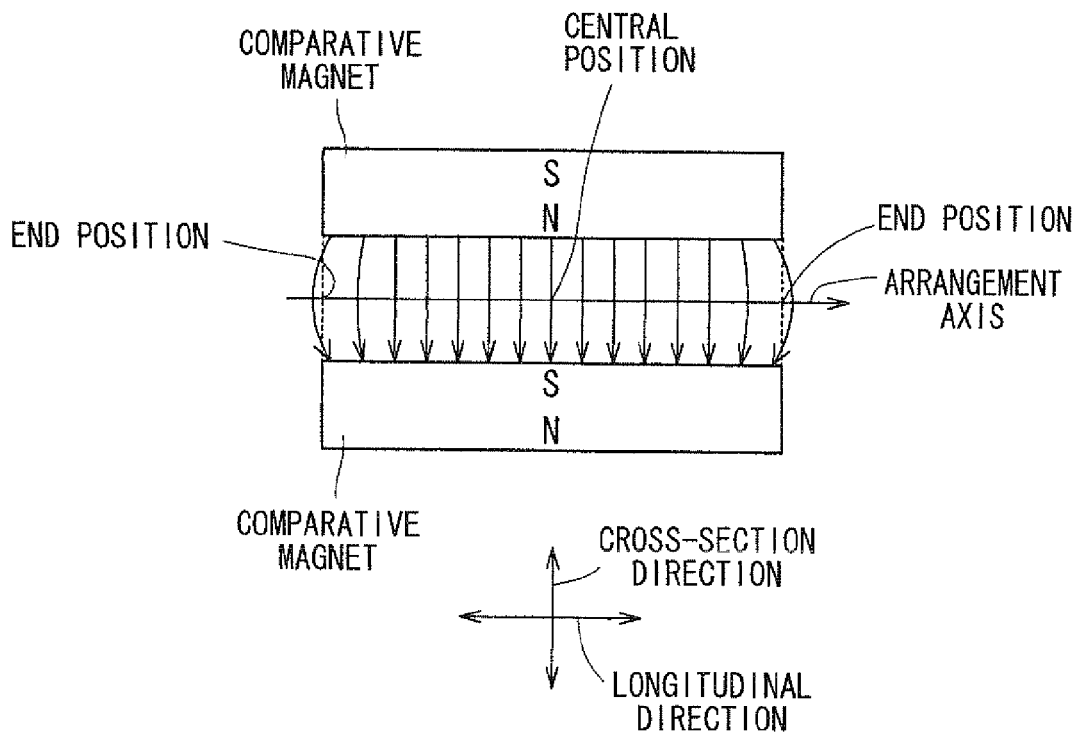

FIG. 23
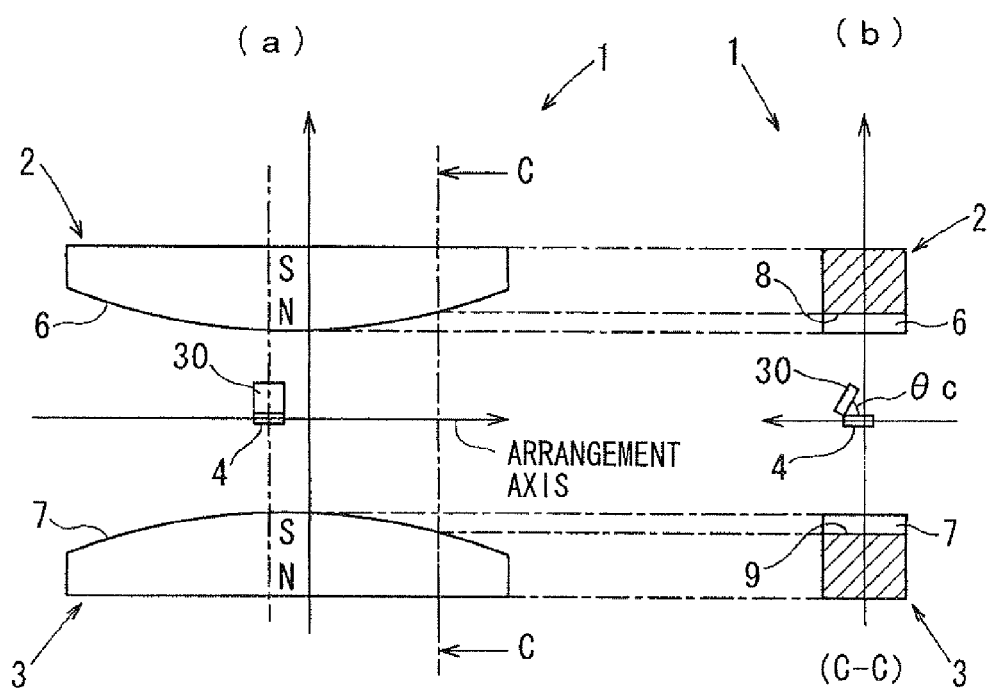
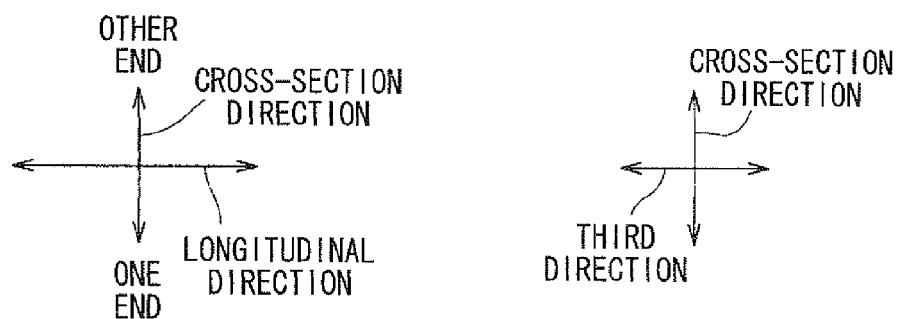

STROKE SENSOR AND ROTATION ANGLE SENSOR

CROSS REFERENCE TO RELATED APPLICATION

This application is based on and incorporates herein by reference Japanese Patent Applications No. 2009-17870 filed on Jan. 29, 2009 and No. 2009-195255 filed on Aug. 26, 2009.

BACKGROUND OF THE INVENTION

1. Field of the Invention

The present invention relates to a stroke sensor that senses a linear displacement amount (i.e., stroke amount) of a sensed body, which is displaced linearly, and to a rotation angle sensor that senses a rotation angle of a sensed body, which rotates.

2. Description of Related Art

Conventionally, many output values of stroke sensors and rotation angle sensors are used for various types of control of a vehicle and occupy important places in the control. For example, the stroke sensor has a movable member, which forms a magnetic flux and which is displaced linearly in accordance with linear displacement of a sensed body, and a fixed member, which senses the magnetic flux and converts the magnetic flux into an electric output for outputting the electric output. For example, the rotation angle sensor has a movable member, which forms a magnetic flux and which rotates in accordance with rotation of the sensed body, and a fixed member, which senses the magnetic flux and converts the magnetic flux into an electric output for outputting the electric output.

The stroke sensor and the rotation angle sensor calculate respective output values based on the electric outputs outputted from the respective fixed members. An electronic control unit (ECU) grasps a stroke amount and a rotation angle of the sensed body based on the output values and performs various kinds of control processing.

The magnetic flux formed by the movable member and the electric output outputted from the fixed member fluctuate in accordance with temperature. Therefore, sensing accuracy of the stroke sensor and the rotation angle sensor cannot be improved more than a limit based on the temperature characteristics. Therefore, in the stroke sensor, a correlation between the stroke amount and the output value does not become an ideal linear characteristic. In the rotation angle sensor, a correlation between the rotation angle and the output value does not become an ideal linear characteristic, either.

There is proposed a position sensor that forms a magnetic flux with two magnets having different polarities and forms a reversed magnetic flux with another two magnets, whereby the position sensor can obtain output values on both plus side and minus side across zero (for example, refer to Patent document 1: JP-A-2004-286017). However, the magnetic flux and the electric output fluctuate in accordance with the temperature also in the position sensor. The sensing accuracy does not improve more than the limit based on the temperature characteristics. If the magnet rotates while being displaced linearly, the sensed magnetic flux density fluctuates. Therefore, a sensing error of the stroke amount accompanying the rotation of the magnet increases.

SUMMARY OF THE INVENTION

It is an object of the present invention to obtain highly accurate output values of a stroke amount and a rotation angle even if a magnetic flux or an electric output fluctuates in accordance with temperature and to inhibit a sensing error of the stroke amount even when a magnet rotates while the magnet is displaced linearly.

According to a first example aspect of the present invention, a stroke sensor senses a linear displacement amount (i.e., stroke amount) of a sensed body displaced linearly. The stroke sensor has a magnet magnetized in a direction perpendicular to a longitudinal direction of the magnet and two magnetism sensitive sections arranged parallel to the longitudinal direction for sensing a magnetic flux formed by the magnet and for outputting electric outputs respectively.

The two magnetism sensitive sections are arranged such that magnetism sensitive surfaces thereof are in the same direction. The magnet is displaced in the longitudinal direction relative to the two magnetism sensitive sections in accordance with the linear displacement of the sensed body and has a magnetism sensitive section facing peripheral edge facing an arrangement axis, on which the two magnetism sensitive sections are arranged, along the direction of the magnetization. The magnetism sensitive section facing peripheral edge is formed in a curved shape such that a correlation between a magnetic flux density on the arrangement axis and a coordinate of the arrangement axis substantially coincides with a sine curve.

Thus, a correlation between the stroke amount of the magnet and the magnetic flux density calculated based on the electric output of certain one of the two magnetism sensitive sections and a correlation between the stroke amount of the magnet and the magnetic flux density calculated based on the electric output of the other one of the two magnetism sensitive sections become two sine curves having the same cycle and different phases. The phase difference between the two sine curves can be calculated from a distance between the two magnetism sensitive sections.

Therefore, the temperature characteristics of the magnetic flux and the temperature characteristics of the electric outputs can be cancelled by obtaining a sum and a difference of a numerical value based on the electric output obtained from the certain one of the magnetism sensitive sections and a numerical value based on the electric output obtained from the other one of the magnetism sensitive sections and by dividing the difference by the sum, for example. In addition, a numerical value equivalent to a tangent that uses the stroke amount of the magnet as a variable can be obtained from the numerical value obtained by the division. By applying inverse trigonometric function processing to the obtained tangent, the correlation between the stroke amount of the magnet and the numerical value obtained by the inverse trigonometric function processing can be made into an ideal linear characteristic unaffected by the temperature characteristics of the magnetic flux and the temperature characteristics of the electric outputs.

Thus, even if the magnetic flux or the electric outputs fluctuate in accordance with the temperature, highly accurate output value can be obtained concerning the stroke amount. Even if the magnet rotates while being displaced linearly, the magnetic flux densities sensed by the two magnetism sensitive sections respectively change at the same rate. Therefore, a sensing error of the stroke amount accompanying the rotation of the magnet can be inhibited.

The above-mentioned shape of the magnetism sensitive section facing peripheral edge that causes the correlation between the magnetic flux density on the arrangement axis and the coordinate of the arrangement axis to substantially coincide with the sine curve is a part of a quadratic curve such as a circular arc and an ellipse arc, for example. The shape of the magnetism sensitive section facing peripheral edge may be convexed toward the arrangement axis or may be concaved away from the arrangement axis.

According to a second example aspect of the present invention, the stroke sensor further has another magnet that has a magnetism sensitive section facing peripheral edge in the same shape as the magnetism sensitive section facing peripheral edge of the magnet. The another magnet is magnetized such that its polarity on its magnetism sensitive section facing peripheral edge side is opposite to a polarity of the magnet on the magnetism sensitive section facing peripheral edge side of the magnet. The another magnet is displaced together with the magnet relative to the two magnetism sensitive sections while maintaining a reflectional symmetry between the magnetism sensitive section facing peripheral edges of the magnet and the another magnet across the arrangement axis. Thus, robustness against positional deviation can be improved.

According to a third example aspect of the present invention, the stroke sensor further has another magnetism sensitive section that is different from the two magnetism sensitive sections and that is arranged at substantially the same position as at least certain one of the two magnetism sensitive sections on the arrangement axis. The another magnetism sensitive section has a magnetism sensitive surface not parallel to the magnetism sensitive surface of the certain one of the two magnetism sensitive sections. The sensed body is displaced linearly and rotates. The magnet and the another magnet are displaced in the longitudinal direction relative to the two magnetism sensitive sections and the another magnetism sensitive section and rotate in accordance with the rotation of the sensed body relative to the two magnetism sensitive sections and the another magnetism sensitive section.

Thus, a correlation between the rotation angle of the magnet and the magnetic flux density calculated based on the electric output of the certain one of the two magnetism sensitive sections and a correlation between the rotation angle of the magnet and the magnetic flux density calculated based on the electric output of the another magnetism sensitive section become two sine curves having the same cycle and different phases. The phase difference between the two sine curves can be calculated from an angle formed between the magnetism sensitive surface of the certain one of the two magnetism sensitive sections and the magnetism sensitive surface of the another magnetism sensitive section.

Therefore, the temperature characteristic of the magnetic flux and the temperature characteristic of the electric outputs can be cancelled by obtaining a sum and a difference of a numerical value based on the electric output obtained from the certain one of the two magnetism sensitive sections and a numerical value based on the electric output obtained from the another magnetism sensitive section and by dividing the difference by the sum, for example. In addition, a numerical value equivalent to a tangent that uses the rotation angle of the magnet as a variable can be obtained from the numerical value obtained by the division. By applying the inverse trigonometric function processing to the obtained tangent, a correlation between the rotation angle of the magnet and a numerical value obtained by the inverse trigonometric function processing can be made into an ideal linear characteristic unaffected by the temperature characteristics of the magnetic flux and the temperature characteristics of the electric outputs.

Thus, even if the magnetic flux or the electric outputs fluctuate in accordance with the temperature, highly accurate output values can be obtained concerning both of the stroke amount and the rotation angle. Therefore, highly accurate sensing of both of the stroke amount and the rotation angle can be performed with the single sensor. Accordingly, improvement of the accuracy and mountability and cost reduction can be achieved at the same time.

According to a fourth example aspect of the present invention, the stroke sensor further has yet another magnetism sensitive section that is different from the another magnetism sensitive section and that is arranged at substantially the same position as the other one of the two magnetism sensitive sections on the arrangement axis. The yet another magnetism sensitive section has a magnetism sensitive surface, which is not parallel to the magnetism sensitive surface of the other one of the two magnetism sensitive sections and which is in the same direction as the magnetism sensitive surface of the another magnetism sensitive section.

Thus, concerning the sensing of the stroke amount, the output value can be calculated by selecting either one of a combination (first combination) of the electric output obtained from the certain one of the two magnetism sensitive sections and the electric output obtained from the other one of the two magnetism sensitive sections and a combination (third combination) of the electric output obtained from the another magnetism sensitive section and an electric output obtained from the yet another magnetism sensitive section.

In addition, concerning the sensing of the rotation angle, the output value can be calculated by selecting either one of a combination (second combination) of the electric output obtained from the certain one of the two magnetism sensitive sections and the electric output obtained from the another magnetism sensitive section and a combination (fourth combination) of the electric output obtained from the other one of the two magnetism sensitive sections and the electric output obtained from the yet another magnetism sensitive section. The magnetic flux formed by the magnet and the another magnet is unique one that provides the correlation between the magnetic flux density on the arrangement axis and the coordinate of the arrangement axis substantially coinciding with the sine curve. Therefore, the magnetic flux densities sensed by the respective magnetism sensitive sections differ from each other according to the stroke amount and the rotation angle.

Therefore, when the stroke amount is sensed, an S/N ratio with respect to the output value can be increased by selecting a combination that provides a higher sensed magnetic flux density between the first and third combinations based on the rotation angle. When the rotation angle is sensed, the S/N ratio with respect to the output value can be increased by selecting a combination that provides a higher sensed magnetic flux density between the second and fourth combinations based on the stroke amount. Thus, more accurate output values can be obtained concerning both of the stroke amount and the rotation angle.

According to a fifth example aspect of the present invention, the stroke sensor selects and uses a combination that provides the higher sensed magnetic flux density between the first and third combinations based on the rotation angle to sense the linear displacement amount. The stroke sensor selects and uses a combination that provides the higher sensed magnetic flux density between the second and fourth combinations based on the linear displacement amount to sense the rotation angle.

According to a sixth example aspect of the present invention, in the stroke sensor, the two magnetism sensitive sections are arranged on the arrangement axis to be distant from each other by a distance of one fourth of a cycle of the sine curve. Thus, the sine curve based on the electric output obtained from the certain one of the two magnetism sensitive sections and the sine curve based on the electric output obtained from the other one of the two magnetism sensitive sections have the same cycle and the phase difference that is one fourth of the cycle. Therefore, if the sine curve based on the electric output obtained from the certain one of the two magnetism sensitive sections is regarded as a sine function that uses the stroke amount of the magnet as a variable, the sine curve based on the electric output obtained from the other one of the two magnetism sensitive sections can be converted into a cosine function that uses the stroke amount of the magnet as a variable.

Therefore, a numerical value equivalent to a tangent that uses the stroke amount of the magnet as a variable can be obtained by dividing a numerical value based on the electric output obtained from the certain one of the two magnetism sensitive sections by a numerical value based on the electric output obtained from the other one of the two magnetism sensitive sections. The temperature characteristics of the magnetic flux and the temperature characteristics of the electric outputs can be cancelled by the division. By applying the inverse trigonometric function processing to the obtained tangent, the correlation between the stroke amount of the magnet and the numerical value obtained by the inverse trigonometric function processing can be made into an ideal linear characteristic unaffected by the temperature characteristics of the magnetic flux and the temperature characteristics of the electric outputs.

Thus, the output value concerning the stroke amount can be calculated with simple mathematical expressions. Accordingly, the arithmetic load for sensing the stroke amount can be reduced.

According to a seventh example aspect of the present invention, in the stroke sensor, the magnetism sensitive surface of the certain one of the two magnetism sensitive sections and the magnetism sensitive surface of the another magnetism sensitive section form a right angle. Thus, the sine curve based on the electric output obtained from the certain one of the two magnetism sensitive sections and the sine curve based on the electric output obtained from the another magnetism sensitive section have the same cycle and a phase difference of the right angle. Therefore, if the sine curve based on the electric output obtained from the certain one of the two magnetism sensitive sections is regarded as a sine function that uses the rotation angle of the magnet as a variable, the sine curve based on the electric output obtained from the another magnetism sensitive section can be converted into a cosine function that uses the rotation angle of the magnet as a variable.

Therefore, a numerical value equivalent to a tangent that uses the rotation angle of the magnet as a variable can be obtained by dividing a numerical value based on the electric output obtained from the certain one of the two magnetism sensitive sections by a numerical value based on the electric output obtained from the another magnetism sensitive section. The temperature characteristics of the magnetic flux and the temperature characteristics of the electric outputs can be cancelled by the division. By applying the inverse trigonometric function processing to the obtained tangent, a correlation between the rotation angle of the magnet and a numerical value obtained by the inverse trigonometric function processing can be made into an ideal linear characteristic unaffected by the temperature characteristics of the magnetic flux and the temperature characteristics of the electric outputs.

Thus, the output value concerning the rotation angle can be calculated with simple mathematical expressions. Therefore, the arithmetic load for sensing the rotation angle can be reduced.

According to an eighth example aspect of the present invention, the magnetism sensitive surface of the other one of the two magnetism sensitive sections and the magnetism sensitive surface of the yet another magnetism sensitive section form a right angle. Thus, the arithmetic load concerning the sensing of the rotation angle can be reduced in both of the case of selecting the second combination and the case of selecting the fourth combination. When the two magnetism sensitive sections, i.e., the certain one and the other one of the two magnetism sensitive sections, are arranged on the arrangement axis to be distant from each other by a distance of one fourth of the cycle of the sine curve, the arithmetic load concerning the sensing of the stroke amount can be reduced in both of the case of selecting the first combination and the case of selecting the third combination.

According to a ninth example aspect of the present invention, the stroke sensor further has a magnetic body covering a peripheral edge of the magnet on a side opposite to the magnetism sensitive section facing peripheral edge with respect to the magnetization direction. Thus, robustness against a disturbance magnetic field can be improved.

According to a tenth example aspect of the present invention, in the stroke sensor, the magnetic body covers a peripheral edge of the another magnet on a side opposite to the magnetism sensitive section facing peripheral edge with respect to the magnetization direction. Thus, also when the stroke sensor has the another magnet, the robustness against the disturbance magnetic field can be improved.

According to an eleventh example aspect of the present invention, the two magnetism sensitive sections of the stroke sensor are Hall elements and are provided by a single chip. Thus, the physique of the stroke sensor can be reduced and the performance and the characteristics of the two magnetism sensitive sections can be equalized further.

According to a twelfth example aspect of the present invention, in the stroke sensor, the two magnetism sensitive sections, the another magnetism sensitive section and the yet another magnetism sensitive section are Hall elements. The two magnetism sensitive sections are provided by a single chip. The another magnetism sensitive section and the yet another magnetism sensitive section are provided by another single chip. Thus, the physique of the stroke sensor can be reduced. The performance and the characteristics of the two magnetism sensitive sections can be equalized further. The performance and the characteristics of the another magnetism sensitive section and the yet another magnetism sensitive section can be equalized further.

According to a thirteenth example aspect of the present invention, in the stroke sensor, the two magnetism sensitive sections, the another magnetism sensitive section and the yet another magnetism sensitive section are Hall elements. The certain one of the two magnetism sensitive sections and the another magnetism sensitive section are provided by a single chip. The other one of the two magnetism sensitive sections and the yet another magnetism sensitive section are provided by another single chip. Thus, the physique of the stroke sensor can be reduced. The performance and the characteristics of the certain one of the two magnetism sensitive sections and the another magnetism sensitive section can be equalized further. The performance and the characteristics of the other one of the two magnetism sensitive sections and the yet another magnetism sensitive section can be equalized further.

According to a fourteenth example aspect of the present invention, the stroke sensor further has yokes fixed to both longitudinal ends of the magnet. This construction shows another mode of the movable member having the magnet.

According to a fifteenth example aspect of the present invention, the stroke sensor further has yokes fixed to both longitudinal ends of the another magnet. This construction shows another mode of the movable members having the magnet and the another magnet.

According to a sixteenth example aspect of the present invention, a stroke sensor has two magnets arranged such that longitudinal directions thereof are parallel to each other and such that the magnets face each other in a cross-section direction perpendicular to the longitudinal direction and two magnetism sensitive sections arranged such that the two magnetism sensitive sections are interposed between the two magnets in the cross-section direction at the same position with respect to the longitudinal direction. The two magnetism sensitive sections are arranged such that magnetism sensitive surfaces thereof are not parallel to each other. Each magnet has a magnetism sensitive section facing peripheral edge that is one of both end peripheral edges of the magnet in the cross-section direction and that faces the two magnetism sensitive sections. The two magnets are magnetized in the cross-section direction respectively and arranged such that the magnetism sensitive section facing peripheral edges of the two magnets have opposite polarities.

Further, the magnetism sensitive section facing peripheral edges of the magnets are formed in substantially the same curved shape such that a correlation between a magnetic flux density on an arrangement axis and a coordinate of the arrangement axis substantially coincides with a sine curve and such that the magnetism sensitive section facing peripheral edges provide a reflectional symmetry therebetween across the arrangement axis. The arrangement axis includes the position where the two magnetism sensitive sections are positioned and extends parallel to the longitudinal direction. The two magnets are displaced in the longitudinal direction relative to the two magnetism sensitive sections in accordance with the linear displacement of the sensed body and rotate relative to the two magnetism sensitive sections in accordance with the rotation of the sensed body while maintaining the reflectional symmetry between the magnetism sensitive section facing peripheral edges of the two magnets.

Thus, although the sensing range of the stroke amount becomes narrower than the constructions according to the above first to fifteenth example aspects of the present invention, the number of the magnetism sensitive sections necessary for sensing the stroke amount can be reduced and the structure can be simplified.

A correlation between a magnetic flux density on the arrangement axis and a coordinate of the arrangement axis is a sine curve. Therefore, a portion of the correlation between the magnetic flux density and the coordinate other than portions, in which the sine curve curves in a convex shape or a concave shape, can be linearly approximated. Therefore, even without using the electric outputs obtained from the two magnetism sensitive sections arranged on the arrangement axis distantly from each other as in the constructions according to the first to fifteenth example aspects of the present invention, the output value concerning the stroke amount can be obtained by arranging the single magnetism sensitive section on the arrangement axis and by using the single electric output obtained from the single magnetism sensitive section alone.

The two magnetism sensitive sections are arranged at the same position on the arrangement axis such that the magnetism sensitive surfaces thereof are not parallel to each other. Thus, like the construction of the third example aspect of the present invention, the correlation between the output value calculated based on the electric outputs obtained from the two magnetism sensitive sections and the rotation angle of the magnet can be made into an ideal linear characteristic unaffected by the temperature characteristics of the magnetic flux and the temperature characteristics of the electric outputs. Therefore, although the sensing range of the stroke amount narrows, the highly accurate output value can be obtained in the wide sensing range concerning the sensing of the rotation angle. Therefore, both of the stroke amount and the rotation angle can be sensed with the smaller number of the magnetism sensitive sections.

As for the electric output to be used for sensing the stroke amount, the electric output obtained from the certain one of the two magnetism sensitive sections or the electric output obtained from the other one of the two magnetism sensitive sections can be selected. Therefore, when the stroke amount is sensed, the S/N ratio with respect to the output value can be increased by selecting the electric output obtained from the magnetism sensitive section that provides the higher sensed magnetic flux density between the two electric outputs obtained from the two magnetism sensitive sections based on the rotation angle.

According to a seventeenth example aspect of the present invention, the stroke sensor senses the linear displacement amount of the sensed body and senses a rotation angle of the sensed body. The stroke sensor corrects the linear displacement amount according to the rotation angle.

The stroke sensor according to the sixteenth example aspect of the present invention senses the stroke amount by using only the single electric output obtained from the single magnetism sensitive section. Therefore, when the magnet rotates in accordance with the rotation of the sensed body, an influence of the rotation angle is very large.

Regarding this point, by correcting the stroke amount in accordance with the rotation angle as in the seventeenth example aspect of the present invention, a highly accurate output value can be obtained concerning the stroke amount.

According to an eighteenth example aspect of the present invention, a rotation angle sensor senses a rotation angle of a rotating sensed body. The rotation angle sensor has two magnets, three magnetism sensitive sections and a rotation-stroke conversion mechanism. The two magnets are arranged such that longitudinal directions thereof are parallel to each other and such that the magnets face each other in a cross-section direction perpendicular to the longitudinal direction. The two magnets rotate in accordance with the rotation of the sensed body. The three magnetism sensitive sections are arranged to be interposed between the two magnets in the cross-section direction. The rotation-stroke conversion mechanism converts the rotation of the two magnets into linear displacement to displace the two magnets linearly in the longitudinal direction.

Certain two of the three magnetism sensitive sections are arranged at substantially the same position with respect to the longitudinal direction such that magnetism sensitive surfaces of the certain two magnetism sensitive sections are not parallel to each other. The other one of the three magnetism sensitive sections is arranged separately from the certain two magnetism sensitive sections on an arrangement axis, which includes the position where the certain two magnetism sensitive sections are arranged and which extends parallel to the longitudinal direction. A magnetism sensitive surface of the other one of the three magnetism sensitive sections is in the same direction as a magnetism sensitive surface of certain one of the certain two magnetism sensitive sections.

Each magnet has a magnetism sensitive section facing peripheral edge that is one of both end peripheral edges of the magnet in the cross-section direction and that faces the three magnetism sensitive sections. The two magnets are magnetized in the cross-section direction respectively such that the magnetism sensitive section facing peripheral edges of the two magnets have opposite polarities. The magnetism sensitive section facing peripheral edges are formed in substantially the same curved shape such that a correlation between a magnetic flux density on the arrangement axis and a coordinate of the arrangement axis substantially coincides with a sine curve and such that the magnetism sensitive section facing peripheral edges provide a reflectional symmetry across the arrangement axis.

The two magnets are displaced linearly in the longitudinal direction and rotate relative to the three magnetism sensitive sections in accordance with the rotation of the sensed body while maintaining the reflectional symmetry between the magnetism sensitive section facing peripheral edges.

Thus, the rotation angle can be converted into the stroke amount. Therefore, even when the rotation angle exceeds 360°, the output value concerning the rotation angle can be related to the rotation angle on a one-on-one basis. The output value is calculated using the electric output obtained from the certain one of the certain two magnetism sensitive sections and the electric output obtained from the other one of the three magnetism sensitive sections. Thus, like the first to fifteenth example aspects of the present invention, the correlation between the stroke amount, which is generated by converting the rotation angle, and the output value can be made into an ideal linear characteristic unaffected by the temperature characteristics of the magnetic flux and the temperature characteristics of the electric outputs.

Therefore, even if the magnetic flux or the electric outputs fluctuate in accordance with the temperature, the rotation angle exceeding 360° can be sensed with high accuracy.

According to a nineteenth example aspect of the present invention, the rotation angle sensor divides the rotation angle into an angle of integral multiple of 360° and an angle equal to or smaller than 360°. The rotation angle sensor senses the angle of the integral multiple of 360° based on a linear displacement amount obtained by converting the rotation of the two magnets by the rotation-stroke conversion mechanism. The rotation angle sensor senses the angle equal to or smaller than 360° by using electric outputs obtained from the certain two magnetism sensitive sections. Thus, the angle of the integral multiple of 360° is sensed roughly from the stroke amount, and the angle equal to or smaller than 360° is sensed more accurately. Thus, more accurate output value can be obtained concerning the rotation angle.

That is, the output value concerning the angle equal to or smaller than 360° is calculated using the electric output obtained from the certain one of the certain two magnetism sensitive sections and the electric output obtained from the other one of the certain two magnetism sensitive sections. Thus, like the third example aspect of the present invention, the correlation between the output concerning the rotation angle equal to or smaller than 360° and the angle equal to or smaller than 360° can be made into an ideal linear characteristic unaffected by the temperature characteristics of the magnetic flux and the temperature characteristics of the electric outputs. Therefore, even if the magnetic flux or the electric outputs fluctuate in accordance with the temperature, highly accurate output value can be obtained concerning the angle equal to or smaller than 360°. Accordingly, more accurate output value can be obtained concerning the rotation angle.

The scheme of dividing the rotation angle into the angle of the integral multiple of 360° and the angle equal to or smaller than 360° and using the output value with higher accuracy concerning the angle equal to or smaller than 360° is effective when the stroke amount is short and the resolution of the rotation angle is coarse.

According to a twentieth example aspect of the present invention, the rotation angle sensor further has another magnetism sensitive section different from the three magnetism sensitive sections. The another magnetism sensitive section is arranged at the same position as the other one of the three magnetism sensitive sections on the arrangement axis. A magnetism sensitive surface of the another magnetism sensitive section is in the same direction as a magnetism sensitive surface of the other one of the certain two magnetism sensitive sections. Thus, the rotation angle sensor has the arrangement similar to that of the four magnetism sensitive sections of the stroke sensor according to the fourth example aspect of the present invention.

Therefore, concerning the sensing of each of the angle of the integral multiple of 360° (or stroke amount generated by converting rotation angle) and the angle equal to or smaller than 360°, like the fourth example aspect of the present invention, the S/N ratio with respect to each of the output values can be improved by selecting the combination that provides the higher sensed magnetic flux density. Thus, more accurate output values can be obtained concerning both of the angle of the integral multiple of 360° and the angle equal to or smaller than 360°. Accordingly, more accurate output value can be obtained concerning the rotation angle.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

FIG. 7A is a magnetic force line diagram showing a magnetic flux formed between two circular-arc-shaped swelling magnets according to the first embodiment;

FIG. 7B is a magnetic force line diagram showing a magnetic flux formed between two comparative magnets of a comparative example;

FIG. 23 is a schematic construction diagram showing a stroke sensor according to a fifth embodiment of the present invention;

DETAILED DESCRIPTION OF EXAMPLE EMBODIMENTS

Figure 1:
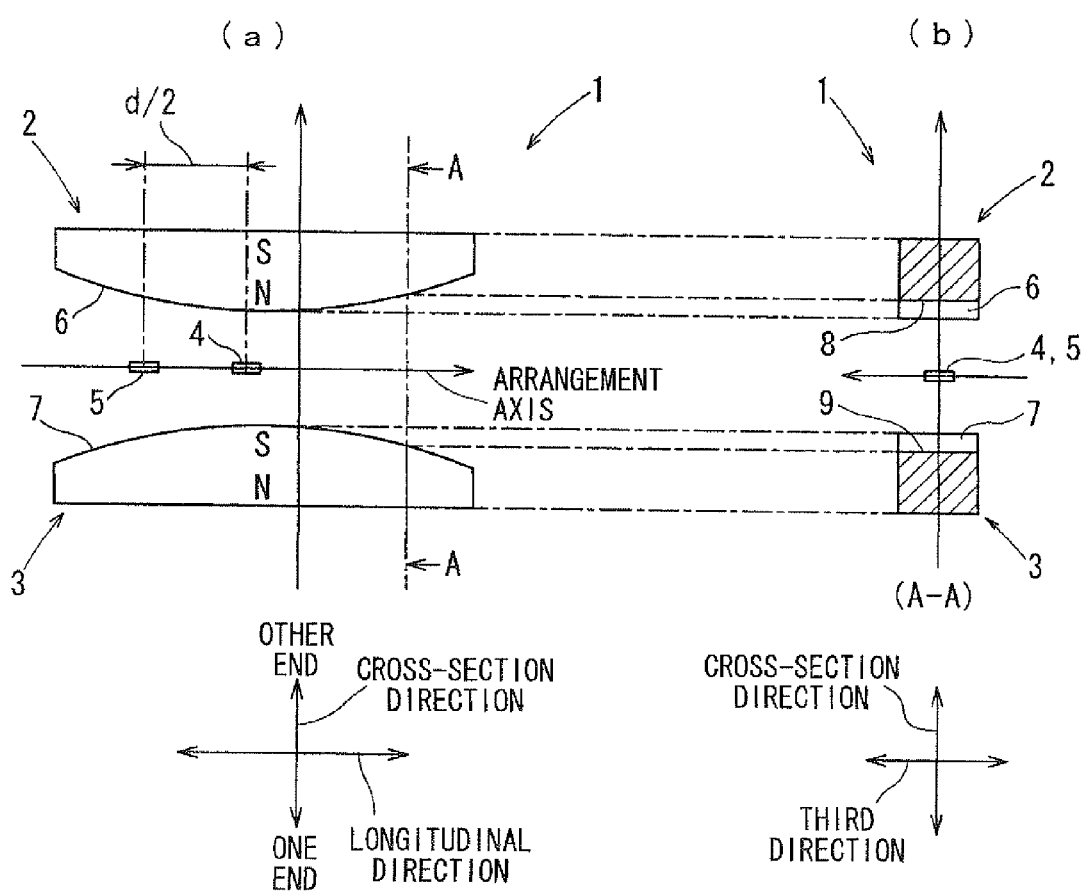
FIG. 1 is a schematic construction diagram showing a stroke sensor according to a first embodiment of the present invention.

A stroke sensor according to a first mode of the present invention senses a linear displacement amount (stroke amount) of a sensed body displaced linearly. The stroke sensor has a magnet magnetized in a direction perpendicular to a longitudinal direction of the magnet and two magnetism sensitive sections arranged parallel to the longitudinal direction. The two magnetism sensitive sections sense a magnetic flux formed by the magnet and generate electric outputs.

The two magnetism sensitive sections are arranged such that magnetism sensitive surfaces thereof are in the same direction. The magnet is displaced in the longitudinal direction relative to the two magnetism sensitive sections in accordance with the linear displacement of the sensed body. The magnet has a magnetism sensitive section facing peripheral edge facing an arrangement axis, on which the two magnetism sensitive sections are arranged, in the direction of the magnetization. The magnetism sensitive section facing peripheral edge is formed in a curved shape such that a correlation between a magnetic flux density on the arrangement axis and a coordinate of the arrangement axis substantially coincides with a sine curve.

The stroke sensor has another magnet that has a magnetism sensitive section facing peripheral edge in the same shape as the magnetism sensitive section facing peripheral edge of the magnet. The another magnet is magnetized such that its polarity on its magnetism sensitive section facing peripheral edge side is opposite to a polarity of the magnet on the magnetism sensitive section facing peripheral edge side of the magnet. The another magnet is displaced together with the magnet relative to the two magnetism sensitive sections while maintaining a reflectional symmetry between the magnetism sensitive section facing peripheral edges of the magnet and the another magnet across the arrangement axis. The two magnetism sensitive sections are arranged on the arrangement axis to be distant from each other by a distance of one fourth of a cycle of the sine curve.

In a stroke sensor according to a second mode of the present invention, two magnetism sensitive sections are Hall elements and are provided by a single chip.

A stroke sensor according to a third mode of the present invention has a magnetic body covering a peripheral edge of the magnet on a side opposite to the magnetism sensitive section facing peripheral edge with respect to the magnetization direction. The magnetic body covers also a peripheral edge of the another magnet on a side opposite to the magnetism sensitive section facing peripheral edge with respect to the magnetization direction.

In a stroke sensor according to a fourth mode of the present invention, another magnetism sensitive section different from the two magnetism sensitive sections is arranged at substantially the same position as at least certain one of the two magnetism sensitive sections on the arrangement axis. The another magnetism sensitive section has a magnetism sensitive surface not parallel to the magnetism sensitive surface of the certain one of the two magnetism sensitive sections. The sensed body is displaced linearly and rotates. The magnet and the another magnet are displaced in the longitudinal direction relative to the two magnetism sensitive sections and the another magnetism sensitive section. The magnet and the another magnet rotate relative to the two magnetism sensitive sections and the another magnetism sensitive section in accordance with the rotation of the sensed body.

The stroke sensor selects and uses a combination that provides a higher sensed magnetic flux density between first and third combinations based on the rotation angle to sense the linear displacement amount. The stroke sensor selects and uses a combination that provides a higher sensed magnetic flux density between second and fourth combinations based on the linear displacement amount to sense the rotation angle. The two magnetism sensitive sections, the another magnetism sensitive section and yet another magnetism sensitive section are Hall elements. The two magnetism sensitive sections are provided by a single chip. The another magnetism sensitive section and the yet another magnetism sensitive section are provided by another single chip.

A stroke sensor according to a fifth mode of the present invention has two magnets arranged such that longitudinal directions thereof are parallel to each other and such that the magnets face each other in a cross-section direction perpendicular to the longitudinal direction and two magnetism sensitive sections arranged such that the magnetism sensitive sections are interposed between the two magnets in the cross-section direction at the same position with respect to the longitudinal direction. The two magnetism sensitive sections are arranged such that magnetism sensitive surfaces thereof are not parallel to each other. Each magnet has a magnetism sensitive section facing peripheral edge that is one of both end peripheral edges of the magnet in the cross-section direction and that faces the two magnetism sensitive sections. The two magnets are magnetized in the cross-section direction respectively such that the magnetism sensitive section facing peripheral edges of the two magnets have opposite polarities.

The magnetism sensitive section facing peripheral edges are formed in substantially the same curved shape such that a correlation between a magnetic flux density on an arrangement axis, which includes the position where the two magnetism sensitive sections are arranged and which extends parallel to the longitudinal direction, and a coordinate of the arrangement axis substantially coincides with a sine curve and such that the magnetism sensitive section facing peripheral edges provide a reflectional symmetry across the arrangement axis. The two magnets are displaced in the longitudinal direction relative to the two magnetism sensitive sections in accordance with the linear displacement of the sensed body and rotate relative to the two magnetism sensitive sections in accordance with the rotation of the sensed body while maintaining the reflectional symmetry between the magnetism sensitive section facing peripheral edges of the two magnets.

The stroke sensor senses the linear displacement amount of the sensed body and senses a rotation angle of the sensed body. The stroke sensor corrects the linear displacement amount according to the rotation angle.

A rotation angle sensor according to a sixth mode of the present invention senses a rotation angle of a sensed body that rotates. The rotation angle sensor has two magnets arranged such that longitudinal directions thereof are parallel to each other and such that the magnets face each other in a cross-section direction perpendicular to the longitudinal direction. The two magnets rotate in accordance with the rotation of the sensed body. The rotation angle sensor has three magnetism sensitive sections arranged to be interposed between the two magnets in the cross-section direction. The rotation angle sensor has a rotation-stroke conversion mechanism that converts the rotation of the two magnets into linear displacement to displace the two magnets linearly in the longitudinal direction.

Certain two of the three magnetism sensitive sections are arranged at substantially the same position with respect to the longitudinal direction such that magnetism sensitive surfaces of the certain two magnetism sensitive sections are not parallel to each other. The other one of the three magnetism sensitive sections is arranged separately from the certain two magnetism sensitive sections on an arrangement axis, which includes the position where the certain two magnetism sensitive sections are arranged and which extends parallel to the longitudinal direction. A magnetism sensitive surface of the other magnetism sensitive section is in the same direction as a magnetism sensitive surface of certain one of the certain two magnetism sensitive sections.

Each magnet has a magnetism sensitive section facing peripheral edge that is one of both end peripheral edges of the magnet in the cross-section direction and that faces the three magnetism sensitive sections. The two magnets are magnetized in the cross-section direction respectively such that the magnetism sensitive section facing peripheral edges of the two magnets have opposite polarities. The magnetism sensitive section facing peripheral edges are formed in substantially the same curved shape such that a correlation between a magnetic flux density on the arrangement axis and a coordinate of the arrangement axis substantially coincides with a sine curve and such that the magnetism sensitive section facing peripheral edges provide a reflectional symmetry across the arrangement axis.

The two magnets are displaced linearly in the longitudinal direction and rotate relative to the three magnetism sensitive sections in accordance with the rotation of the sensed body while maintaining the reflectional symmetry between the magnetism sensitive section facing peripheral edges of the magnets.

The rotation angle sensor divides the rotation angle into an angle of integral multiple of 360° and an angle equal to or smaller than 360°. The rotation angle sensor senses the angle of the integral multiple of 360° based on a linear displacement amount obtained by converting the rotation of the two magnets by the rotation-stroke conversion mechanism. The rotation angle sensor senses the angle equal to or smaller than 360° by using electric outputs obtained from the certain two magnetism sensitive sections.

The rotation angle sensor has another magnetism sensitive section different from the three magnetism sensitive sections. The another magnetism sensitive section is arranged at the same position as the other one of the three magnetism sensitive sections on the arrangement axis. A magnetism sensitive surface of the another magnetism sensitive section is in the same direction as a magnetism sensitive surface of the other one of the certain two magnetism sensitive sections.

First Embodiment

A construction of a stroke sensor 1 according to a first embodiment of the present invention will be explained with reference to FIGS. 1 to 6. The stroke sensor 1 senses a linear displacement amount (stroke amount) of a sensed body (not shown) displaced linearly. As shown in FIG. 1, the stroke sensor 1 has two magnets 2, 3 as movable members, which form a magnetic flux and are displaced linearly in accordance with the displacement of the sensed body, and two magnetism sensitive sections 4, 5 as fixed members, which sense the magnetic flux and convert the magnetic flux into electric outputs for outputting the electric outputs. The stroke sensor 1 is a non-contact sensor capable of sensing the stroke amount of the sensed body without causing contact between the movable member and the fixed member.

For example, the stroke sensor 1 is mounted in a vehicle and calculates an output value based on the electric outputs outputted from the two magnetism sensitive sections 4, 5. The calculated output value is inputted into an electronic control unit (ECU) and is used for various kinds of control processing. For example, the stroke sensor 1 can be suitably applied as a height sensor for sensing change of a suspension, a cam stroke sensor for sensing a position of a camshaft that drives an intake valve of an engine, an EGR lift sensor for sensing a lift amount of an EGR actuator that varies EGR quantity and the like.

The stroke sensor 1 can be suitably used in a toroidal CVT (continuously variable transmission) for grasping a position of a power roller that decides a change gear ratio by contacting an input disc and an output disc. The toroidal CVT is an automatic transmission capable of varying the change gear ratio in a stepless manner.

Each of the magnets 2, 3 is formed in the shape of a long rod such that each of the magnets 2, 3 swells in a circular arc shape in its cross-section direction perpendicular to its longitudinal direction. Thus, the magnets 2, 3 have swelling end edges 6, 7 respectively. That is, each of the swelling end edges 6, 7 of the magnets 2, 3 is formed in the shape of a circular arc. Each of the magnets 2, 3 is magnetized in its cross-section direction. The magnets 2, 3 are arranged such that the longitudinal directions thereof coincide with each other and such that the cross-section directions thereof coincide with each other. The magnets 2, 3 are displaced linearly in the longitudinal direction in accordance with the displacement of the sensed body.

The two magnetism sensitive sections 4, 5 are arranged on an arrangement axis. The swelling end edges 6, 7 are arranged to face the arrangement axis along the direction of the magnetization respectively. That is, the swelling end edges 6, 7 respectively provide magnetism sensitive section facing peripheral edges that face the arrangement axis in the magnetization direction. The swelling end edges 6, 7 face each other to provide a reflectional symmetry therebetween across the arrangement axis. The magnets 2, 3 are magnetized and arranged such that a polarity of the magnet 2 on one end side with respect to the cross-section direction is opposite to a polarity of the magnet 3 on the other end side with respect to the cross-section direction. That is, the polarity on the swelling end edge 6 side of the magnet 2 is opposite to the polarity on the swelling end edge 7 side of the magnet 3.

The magnets 2, 3 move in the longitudinal direction while maintaining the above positional relationship of the swelling end edges 6, 7 and maintaining the reflectional symmetry. The direction of the arrangement axis is parallel to the longitudinal direction. The magnetization direction is the same as or is parallel to the cross-section direction.

As shown in FIG. 1, a third direction is defined as a direction perpendicular to both of the longitudinal direction and the cross-section direction. When it is assumed that the swelling end edges 6, 7 are cut by a virtual plane perpendicular to the longitudinal direction, cutting-plane lines 8, 9 formed by the swelling end edges 6, 7 and the virtual plane define line segments that are parallel to the third direction and have the same length regardless of a coordinate of the virtual plane on the arrangement axis. That is, each of the swelling end edges 6, 7 defines a circular arc curved surface, which is an elongated rectangular plane curved in the shape of a circular arc. Part (b) of FIG. 1 shows a cross section of the stroke sensor 1 of part (a) of FIG. 1 taken along the line A-A.

Figure 2:
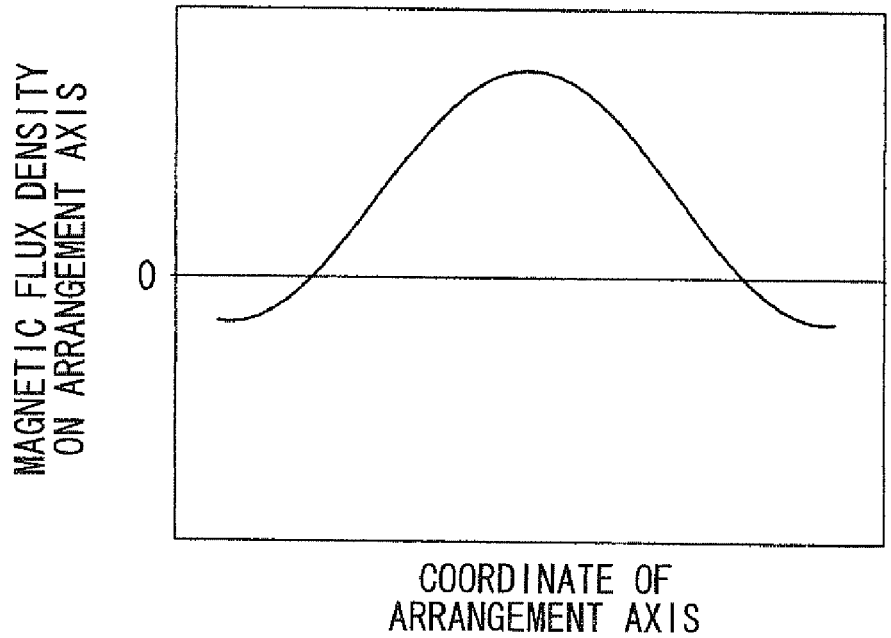
FIG. 2 is a characteristic diagram showing a distribution of a magnetic flux density on an arrangement axis according to the first embodiment.

Since the swelling end edges 6, 7 face each other, a magnetic flux density on the arrangement axis perpendicular to the cross-section direction shows a distribution as shown in FIG. 2, for example. According to the distribution of the magnetic flux density, since the swelling end edges 6, 7 are the circular arcs, a correlation between the magnetic flux density on the arrangement axis and the coordinate of the arrangement axis substantially coincides with a sine curve provided by adding an offset to a sine function, for example. The magnetic flux having such the correlation is linearly displaced in the longitudinal direction together with the magnets 2, 3.

Each of the magnetism sensitive sections 4, 5 is a Hall IC having a Hall element (not shown) and a circuit (not shown) packaged as a single body. The Hall element senses the magnetic flux generated by the magnets 2, 3 and generates an analog signal. The circuit performs digital processing of the analog signal obtained from the Hall element. The magnetism sensitive sections 4, 5 output digitized electric outputs to an arithmetic circuit 13 explained later.

As shown in part (a) of FIG. 1, the magnetism sensitive sections 4, 5 are arranged at a predetermined interval on the arrangement axis. The predetermined interval is one fourth (d/2) of a cycle (2d) of the sine curve, which is the correlation between the magnetic flux density on the arrangement axis and the coordinate of the arrangement axis. That is, the magnetism sensitive sections 4, 5 are arranged to be distant from each other by the distance d/2 on the arrangement axis.

The magnetism sensitive sections 4, 5 are the compatible Hall ICs having the identical performance and the identical characteristics. That is, if voltages applied to the Hall elements of the magnetism sensitive sections 4, 5 are the same and temperatures of the Hall elements are the same, Hall currents Ia, Ib of the magnetism sensitive sections 4, 5 take the same value. If the temperatures of the Hall elements of the magnetism sensitive sections 4, 5 are the same, Hall coefficients Ka, Kb of the magnetism sensitive sections 4, 5 take the same value. The magnetism sensitive sections 4, 5 are arranged such that magnetism sensitive surfaces thereof are in the same direction, e.g., a direction perpendicular to the cross-section direction.

Figure 3:
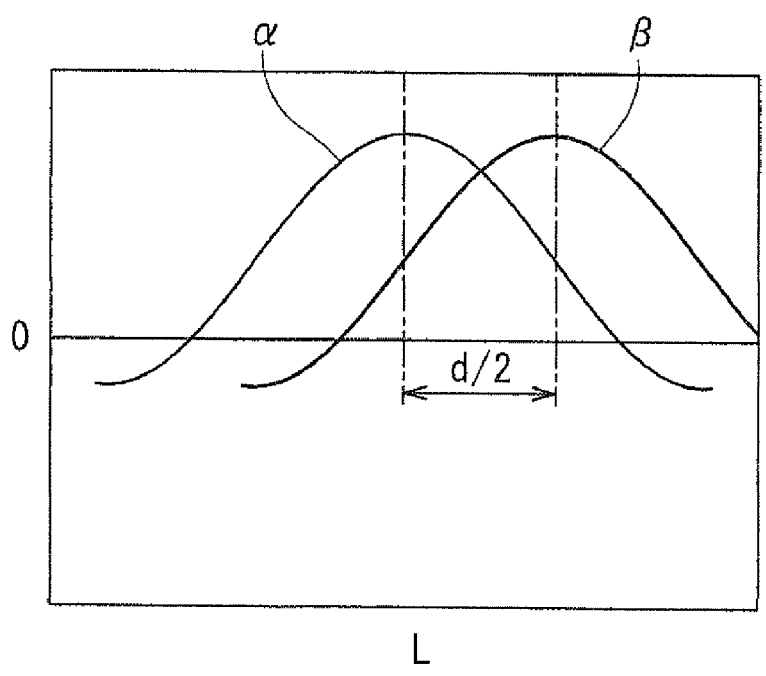
FIG. 3 is a characteristic diagram showing a correlation between a stroke amount and the magnetic flux density obtained directly based on an electric output of a magnetism sensitive section according to the first embodiment.

With the above-described construction, correlations between the linear displacement amount (stroke amount L) of the magnets 2, 3 in the longitudinal direction and the magnetic flux densities directly obtained based on the electric outputs of the magnetism sensitive sections 4, 5 (i.e., magnetic flux densities directly sensed by magnetism sensitive sections 4, 5) substantially coincide with sine curves provided by adding an offset to sine functions having a phase difference d/2 therebetween, for example, as shown by characteristic lines α and β in FIG. 3.

That is, the characteristic line a substantially coincides with a sine curve provided by adding an offset to a sine function that uses the stroke amount L as a variable. The characteristic line β is provided by performing parallel translation of the characteristic line a by the amount d/2. The amount d/2 is equivalent to one fourth of the cycle 2d of the characteristic line α. Therefore, the characteristic line β substantially coincides with a cosine curve provided by adding an offset to a cosine function that uses the stroke amount L as a variable. Amplitude is the same between the characteristic lines α, β.

Figure 4A:
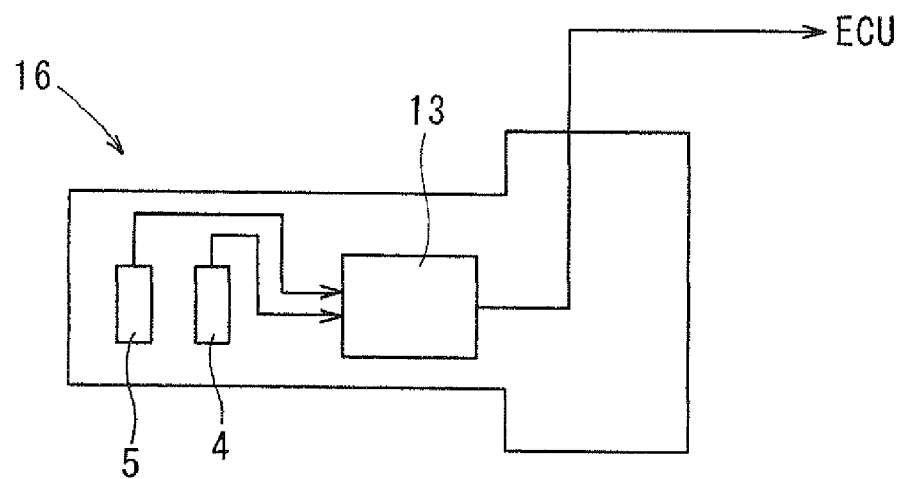
FIG. 4A is a schematic construction diagram showing a sensor assembly of the stroke sensor according to the first embodiment.
Figure 4B:
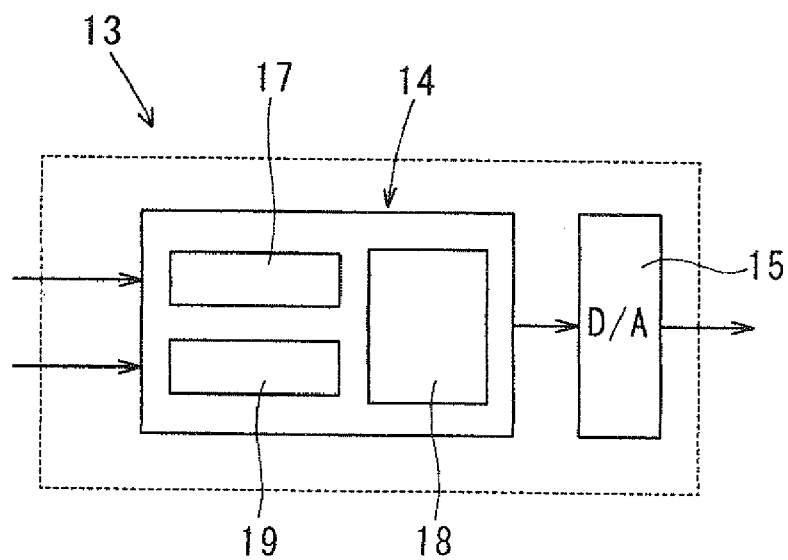
FIG. 4B is a schematic construction diagram showing an arithmetic circuit included in the sensor assembly according to the first embodiment.

Various kinds of arithmetic processing are applied to the electric outputs outputted from the magnetism sensitive sections 4, 5 in a DSP 14 (digital signal processor) shown in FIG. 4B. The DSP 14 constitutes a single arithmetic circuit 13 together with a D/A converter 15. As shown in FIG. 4A, the arithmetic circuit 13 constitutes a single sensor assembly 16 together with the two Hall ICs as the magnetism sensitive sections 4, 5.

The DSP 14 has functions of a first offset adjusting device 17 for subtracting the offset amount from each of the electric outputs obtained from the magnetism sensitive sections 4, 5, a first inverse trigonometric function calculating device 18 for applying inverse trigonometric function calculation to a numerical value obtained using the two calculated values obtained from the first offset adjusting device 17, and a gain adjusting device 19.

The first offset adjusting device 17 uses a numerical value equivalent to an intermediate value between the maximum and the minimum of the magnetic flux densities in the characteristic lines α, β as the offset amount and subtracts the offset amount from the magnetic flux densities directly obtained based on the electric outputs of the magnetism sensitive sections 4, 5. The intermediate value is calculated as a weighted average of the maximum and the minimum, for example.

Figure 5:
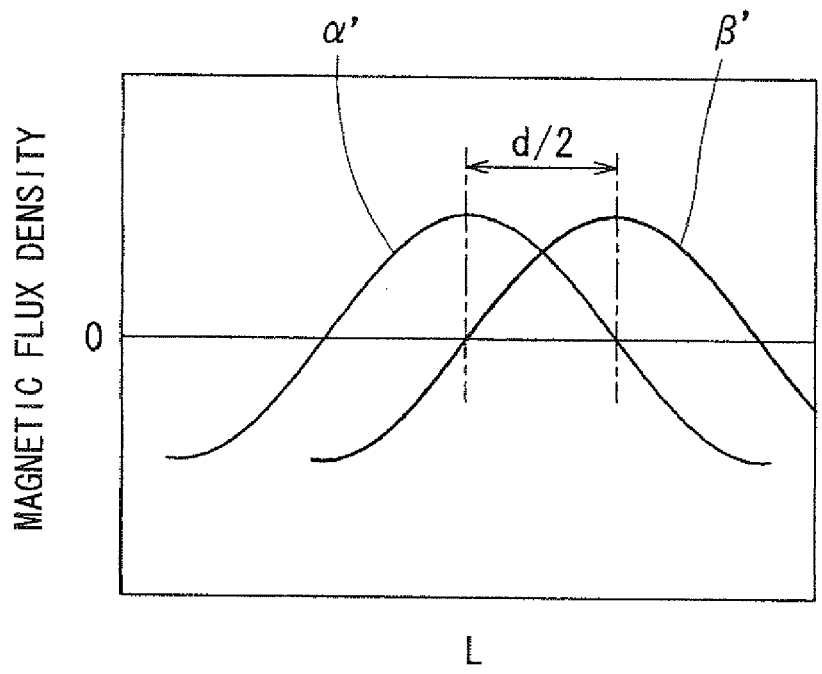
FIG. 5 is a characteristic diagram showing a correlation between the stroke amount and the magnetic flux density after offset adjustment according to the first embodiment.

Thus, the characteristic line α in FIG. 3 becomes a characteristic line a' substantially coinciding with a sine function that uses the stroke amount L as a variable as shown in FIG. 5. The characteristic line β in FIG. 3 becomes a characteristic line β' substantially coinciding with a cosine function that uses the stroke amount L as a variable as shown in FIG. 5. That is, the magnetic flux densities having passed through the processing of the first offset adjusting device 17, i.e., the correlations between the magnetic flux densities and the stroke amount L after the offset adjustment, become the characteristic line α' approximated to the sine function that uses the stroke amount L as the variable and the characteristic line β' approximated to the cosine function that uses the stroke amount L as the variable respectively.

Therefore, the output values equivalent to the magnetic flux densities after the offset adjustment, i.e., output voltages Va, Vb obtained by applying the offset adjustment to the Hall voltages outputted from the two Hall ICs (magnetism sensitive sections 4, 5), are expressed by approximate expressions of following Expressions 1 and 2 using respective amplitudes Ea, Eb.

$$Va = Ea \cdot \sin L \quad \text{(Expression 1)}$$

$$Vb = Eb \cdot \cos L \quad \text{(Expression 2)}$$

The amplitudes Ea, Eb are expressed by following Expressions 3 and 4 by using an amplitude B of the distribution of the magnetic flux density shown in FIG. 2.

$$Ea = Ka \cdot Ia \cdot B \quad \text{(Expression 3)}$$

$$Eb = Kb \cdot Ib \cdot B \quad \text{(Expression 4)}$$

The magnetism sensitive sections 4, 5 are the compatible Hall ICs having the identical performance and the identical characteristics and are used in the atmosphere of the same temperature. Therefore, the Hall currents Ia, Ib are equal to each other, and the Hall coefficients Ka, Kb are equal to each other. The magnetism sensitive sections 4, 5 sense the same magnetic flux formed by the magnets 2, 3. Therefore, the numerical value of the amplitude B is the same between the magnetism sensitive sections 4, 5. Therefore, the amplitudes Ea, Eb are equal to each other. Therefore, as shown in following Expression 5, a value Va/Vb substantially coincides with a tangent that uses the stroke amount L as a variable.

$$Va/Vb = \tan L \quad \text{(Expression 5)}$$

Therefore, the stroke amount L can be obtained by applying the inverse trigonometric function calculation to the value Va/Vb as shown in following Expression 6.

$$L = \arctan(Va/Vb) \quad \text{(Expression 6)}$$

The first inverse trigonometric function calculating device 18 performs arithmetic processing equivalent to Expressions 5 and 6 by applying the inverse trigonometric function calculation to a numerical value obtained by performing division of the two calculated values obtained from the first offset adjusting device 17. The first inverse trigonometric function calculating device 18 applies arithmetic processing, which is equivalent to following Expression 7, to the numerical value obtained by the inverse trigonometric function and defines the numerical value obtained by the arithmetic processing as an output value V(L) of the stroke amount L.

$$V(L) = \arctan(Va/Vb) \cdot d/\pi \quad \text{(Expression 7)}$$

Figure 6:
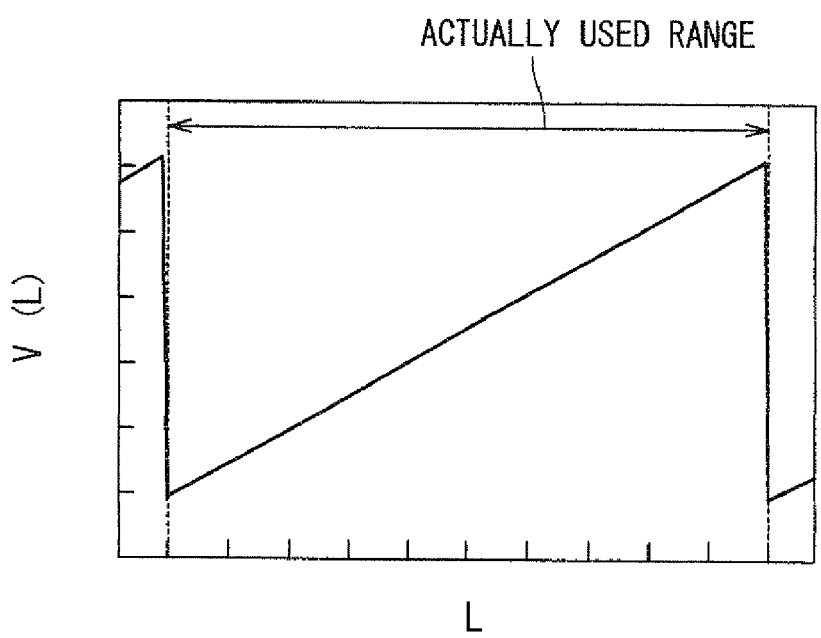
FIG. 6 is a characteristic diagram showing a correlation between the stroke amount and an output value concerning the stroke amount according to the first embodiment.

Thus, the output value V(L) with respect to the stroke amount L shows an ideal linear characteristic in an actually used range of the stroke amount L as shown in FIG. 6. A digital signal equivalent to the calculated output value V(L) undergoes the analog processing in the D/A converter 15 and is outputted to the ECU (refer to FIG. 4). The gain adjusting device 19 performs electric adjustment to equalize the amplitudes Ea, Eb when the electric amplitudes Ea, Eb are unequal due to electric difference.

(Effects of First Embodiment)

The stroke sensor 1 according to the first embodiment has the two magnets 2, 3 and the two magnetism sensitive sections 4, 5. The two magnets 2, 3 are arranged such that the longitudinal directions of the magnets 2, 3 are parallel to each other and such that the magnets 2, 3 face each other in the cross-section direction perpendicular to the longitudinal direction. The magnets 2, 3 are linearly displaced in the longitudinal direction in accordance with the linear displacement of the sensed body. The magnetism sensitive sections 4, 5 are arranged parallel to the longitudinal direction such that the magnetism sensitive sections 4, 5 are interposed between the two magnets 2, 3 in the cross-section direction and such that the magnetism sensitive sections 4, 5 are distanced from each other in the longitudinal direction.

The magnets 2, 3 have the swelling end edges 6, 7 in the circular arc shapes respectively. The swelling end edges 6, 7 face each other to provide the reflectional symmetry therebetween across the arrangement axis. The magnets 2, 3 are magnetized and arranged such that the polarity on the swelling end edge 6 side of the magnet 2 is opposite to the polarity on the swelling end edge 7 side of the magnet 3. The magnets 2, 3 are displaced linearly in the longitudinal direction while maintaining the above positional relationship of the swelling end edges 6, 7.

As a result, the distribution of the magnetic flux density on the arrangement axis, on which the magnetism sensitive sections 4, 5 are arranged, substantially coincides with the sine curve formed by adding the offset to the sine function having the cycle of $2d$, for example (refer to FIG. 2). The magnetic flux having such the distribution is linearly displaced in the longitudinal direction together with the magnets 2, 3. The magnetism sensitive sections 4, 5 sense the magnetic flux displaced in this way, thereby varying the electric outputs outputted by the magnetism sensitive sections 4, 5. The magnetism sensitive sections 4, 5 are arranged to be distant from each other by the distance $d/2$ on the arrangement axis.

Thus, both of the characteristic line a as the correlation between the stroke amount L and the magnetic flux density calculated based on the electric output of the magnetism sensitive section 4 and the characteristic line β as the correlation between the stroke amount L and the magnetic flux density calculated based on the electric output of the magnetism sensitive section 5 substantially coincide with the sine curves. The characteristic lines α, β have the same cycle, and a phase difference therebetween is one fourth of the cycle (refer to FIG. 3). Therefore, if the characteristic line a' obtained by applying the offset adjustment to the characteristic line α is regarded as the sine function that uses the stroke amount L as the variable, the characteristic line β' obtained by applying the offset adjustment to the characteristic line β can be regarded as the cosine function that uses the stroke amount L as the variable (refer to FIG. 5).

Therefore, the numerical value equivalent to the tangent that uses the stroke amount L as the variable can be obtained by dividing the output voltage Va, which is obtained by applying the offset adjustment to the Hall voltage outputted from the magnetism sensitive section 4, by the output voltage Vb, which is obtained by applying the offset adjustment to the Hall voltage outputted from the magnetism sensitive section 5. The temperature characteristics of the magnetic flux formed by the magnets 2, 3 and the temperature characteristics of the electric outputs obtained from the magnetism sensitive sections 4, 5 can be cancelled by the division (refer to Expression 5).

By applying the inverse trigonometric function processing to the obtained tangent, the correlation between the stroke amount L and the numerical value obtained by the inverse trigonometric function processing can be made into the ideal linear characteristic unaffected by the temperature characteristics of the magnetic flux and the temperature characteristics of the electric outputs (refer to Expressions 6 and 7). Thus, even if the magnetic flux formed by the magnets 2, 3 as the movable members or the electric outputs obtained from the magnetism sensitive sections 4, 5 as the fixed members fluctuate with the temperature, a highly accurate output value V(L) concerning the stroke amount L can be obtained.

When the magnets 2, 3 rotate about the arrangement axis, the magnetic flux densities sensed by the magnetism sensitive sections 4, 5 respectively change at the same ratio. Therefore, a sensing error of the stroke amount L accompanying the rotation of the magnets 2, 3 can be inhibited.

The distance between the magnetism sensitive sections 4, 5 is one fourth of the cycle $2d$ of the characteristic lines α, β. Therefore, if the characteristic line at is regarded as the sine function that uses the stroke amount L as the variable, the characteristic line β' can be regarded as the cosine function that uses the stroke amount L as the variable. Therefore, the stroke amount L can be calculated more easily than in the case where the distance between the magnetism sensitive sections 4, 5 is not one fourth of the cycle $2d$. Therefore, the arithmetic load can be reduced.

The cutting-plane lines 8, 9 formed by the swelling end edges 6, 7 and the virtual plane perpendicular to the longitudinal direction define the line segments that are parallel to the third direction and have the same length regardless of the coordinate of the virtual plane on the arrangement axis (refer to part (b) of FIG. 1). Therefore, the distribution of the magnetic flux density on the arrangement axis can be surely approximated to the sine curve.

The distribution of the magnetic flux density on the arrangement axis (i.e., correlation between magnetic flux density on arrangement axis and coordinate of arrangement axis) approximates to the sine curve and the error with respect to the stroke amount L decreases when the circular-arc-shaped swelling magnets 2, 3 according to the first embodiment are used. These effects of the present embodiment will be explained based on comparison with the case of magnets in the shape of simple sticks with reference to FIGS. 7A and 7B. Hereafter, the stick-shaped magnet as the comparison object will be referred to as a comparative magnet. FIG. 7A shows a magnetic flux formed between the magnets 2, 3 in the swelling circular arc shapes according to the first embodiment by lines of magnetic force. FIG. 7B shows a magnetic flux formed between the two comparative magnets by lines of magnetic force.

Figure 8A:
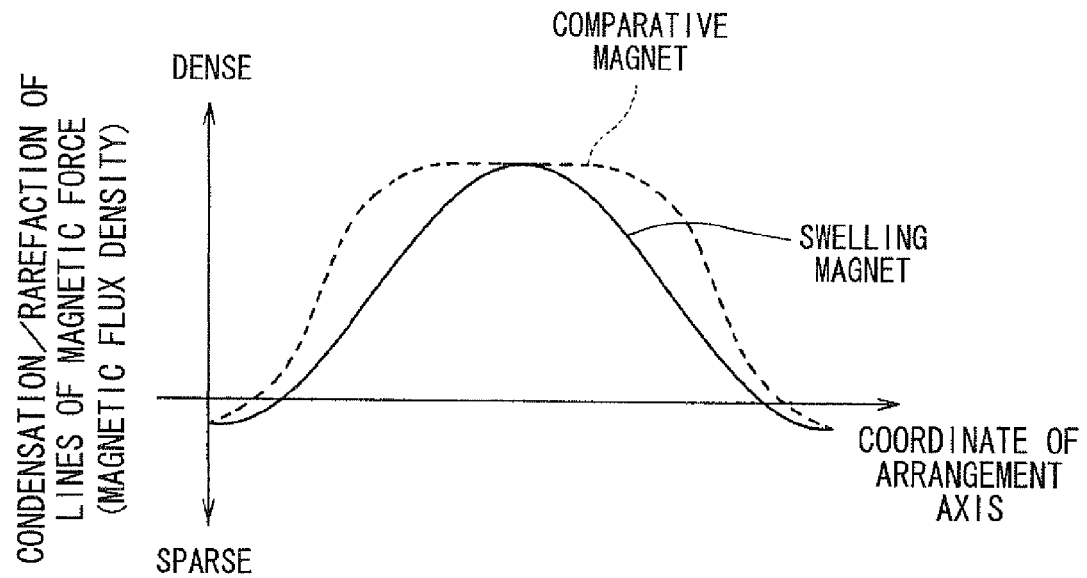
FIG. 8A is a comparison diagram showing a correlation between a coordinate of the arrangement axis and condensation and rarefaction of the lines of magnetic force on the arrangement axis according to the first embodiment.

Condensation and rarefaction of the intervals of the lines of the magnetic force, which are equivalent to the magnetic flux density, on the arrangement axis within the range where the magnets 2, 3 face each other in the case of the swelling shapes as in the magnets 2, 3 are shown in FIG. 7A. As shown in FIG. 7A, the lines of the magnetic force are the densest in a central position, where the distance between the swelling end edges 6, 7 in the cross-section direction is the shortest. The lines of the magnetic force are the sparsest in both lateral ends in FIG. 7A, where the distance between the swelling end edges 6, 7 in the cross-section direction is the longest. The lines of magnetic force on the arrangement axis become gradually sparser along a direction from the central position toward the both end positions. Since the swelling end edges 6, 7 are formed in the circular arc shapes, the correlation between the condensation and rarefaction of the intervals of the lines of magnetic force on the arrangement axis and the coordinate of the arrangement axis can be substantially coincided with the sine curve (refer to correlation of circular-arc-shaped swelling magnets indicated by solid line in FIG. 8A).

As contrasted thereto, condensation and rarefaction of the intervals of the lines of the magnetic force on the arrangement axis within the range where the two comparative magnets face each other in the case of the comparative magnets is shown in FIG. 7B. As shown in FIG. 7B, the intervals of the lines of the magnetic force are substantially constant over a wide range including a central position. The lines of the magnetic force are sparser near end positions than in the central position in FIG. 7B. Therefore, the condensation and rarefaction of the intervals of the lines of the magnetic force on the arrangement axis are maintained constant along a direction from the central position toward the both end positions. The lines of the magnetic force become sparse suddenly when a predetermined position is passed (refer to correlation of comparative magnets indicated by broken line in FIG. 8A).

Figure 8B:
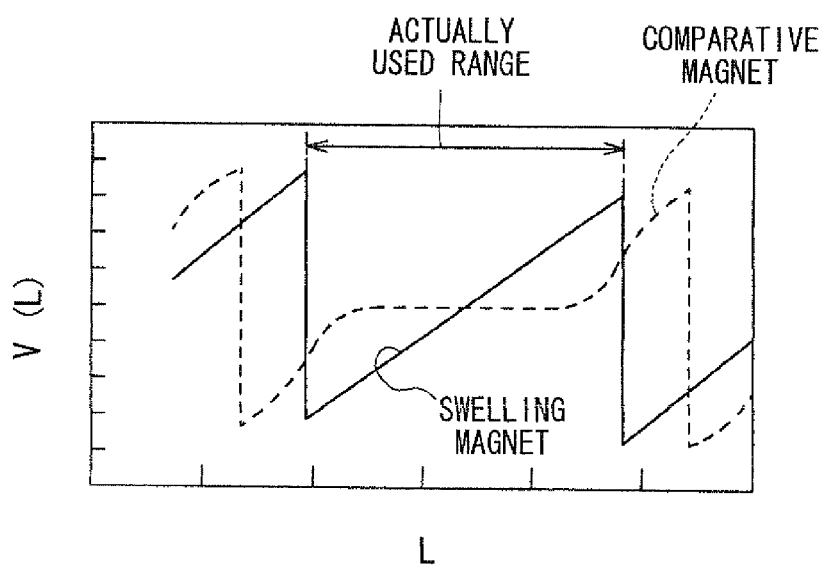
FIG. 8B is a comparison diagram showing a correlation between the stroke amount and a final output value of the stroke sensor according to the first embodiment.

As a result, when the comparative magnets are used as the movable members, the correlation between the stroke amount L and the output value V(L) does not become an ideal linear characteristic in the actually used range of the stroke amount L (as indicated by broken line in FIG. 8B). An error with respect to the stroke amount L becomes larger in the case of the circular-arc-shaped swelling magnets 2, 3 (indicated by solid line in FIG. 8B).

Second Embodiment

Figure 9A:
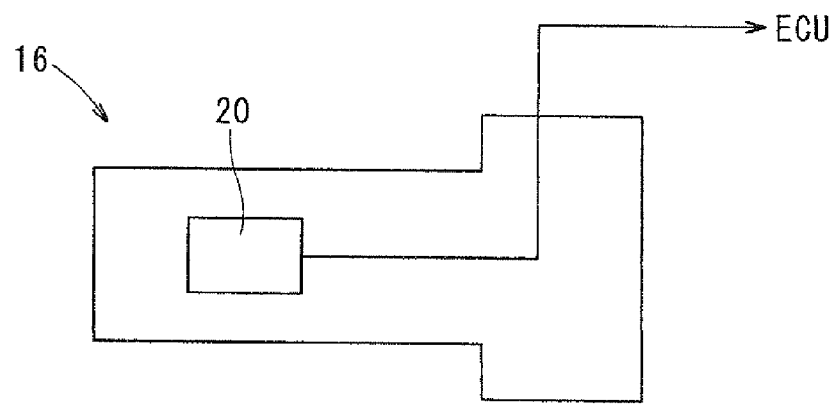
FIG. 9A is a schematic construction diagram showing a sensor assembly of a stroke sensor according to a second embodiment of the present invention.
Figure 9B:
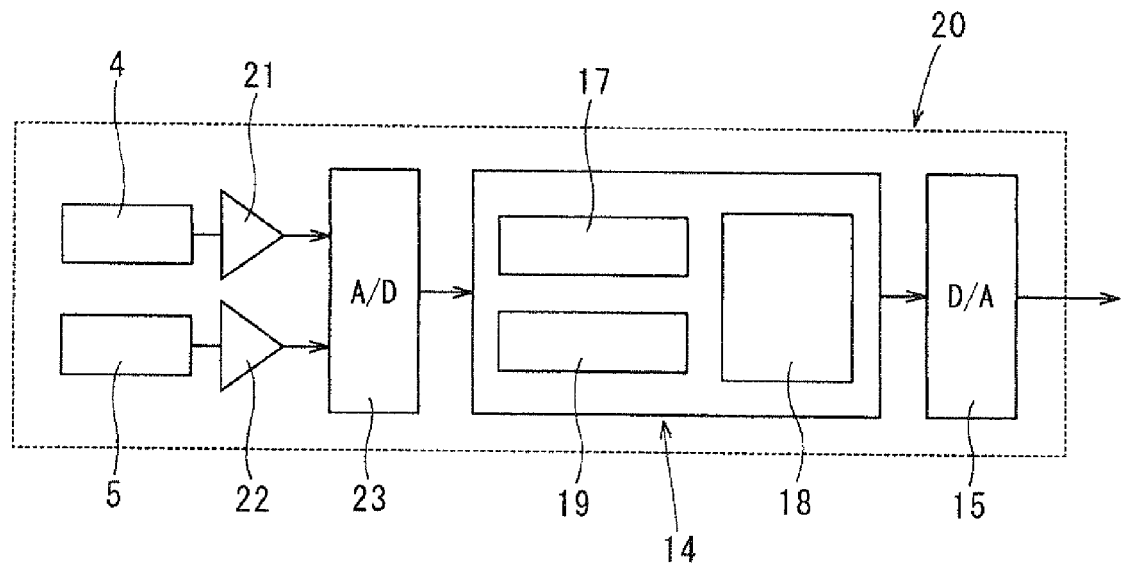
FIG. 9B is a schematic construction diagram showing a chip included in the sensor assembly according to the second embodiment.

Next, a stroke sensor 1 according to a second embodiment of the present invention will be explained. The stroke sensor 1 according to the second embodiment has magnetism sensitive sections 4, 5, which are compatible Hall elements having the identical performance and the identical characteristics. As shown in FIGS. 9A and 9B, the magnetism sensitive sections 4, 5 are provided by a single chip 20 together with a DSP 14 having functions of a first offset adjusting device 17, a first inverse trigonometric function calculating device 18 and a gain adjusting device 19.

The chip 20 further has functions of operational amplifiers 21, 22 amplifying output signals from the Hall elements as the magnetism sensitive sections 4, 5, an A/D converter 23 performing digital processing of the amplified output signals, and a D/A converter 15. Thus, the physique of the stroke sensor 1 can be reduced and the performance and the characteristics of the magnetism sensitive sections 4, 5 can be equalized further.

Third Embodiment

Figure 10:
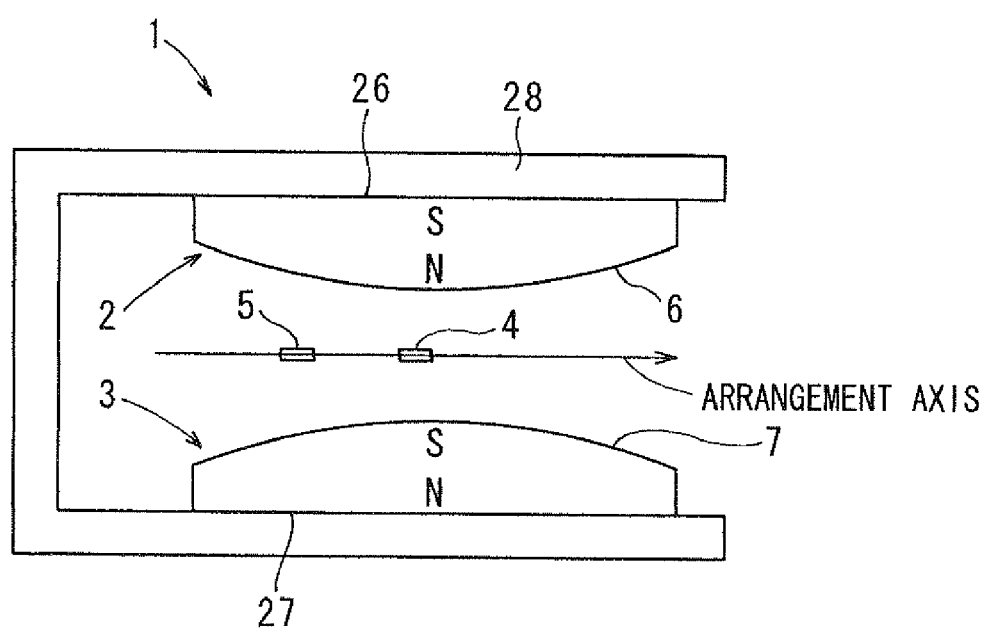
FIG. 10 is a schematic construction diagram showing a stroke sensor according to a third embodiment of the present invention.

Next, a stroke sensor 1 according to a third embodiment of the present invention will be explained. As shown in FIG. 10, the stroke sensor 1 according to the third embodiment has a magnetic body 28 that covers peripheries 26, 27 of the magnets 2, 3 on sides opposite from the swelling end edges 6, 7 with respect to the magnetization direction. Thus, robustness against a disturbance magnetic field can be improved.

Fourth Embodiment

Next, a construction of a stroke sensor 1 according to a fourth embodiment of the present invention will be explained with reference to FIGS. 11 to 22. The stroke sensor 1 according to the fourth embodiment can sense a rotation angle θ in addition to the stroke amount L. For example, the stroke sensor 1 can be suitably used in a toroidal CVT for grasping both of a position and a tilt angle concerning a tilt axis direction of a trunnion, which holds a power roller such that the power roller can freely tilt.

Figure 11:
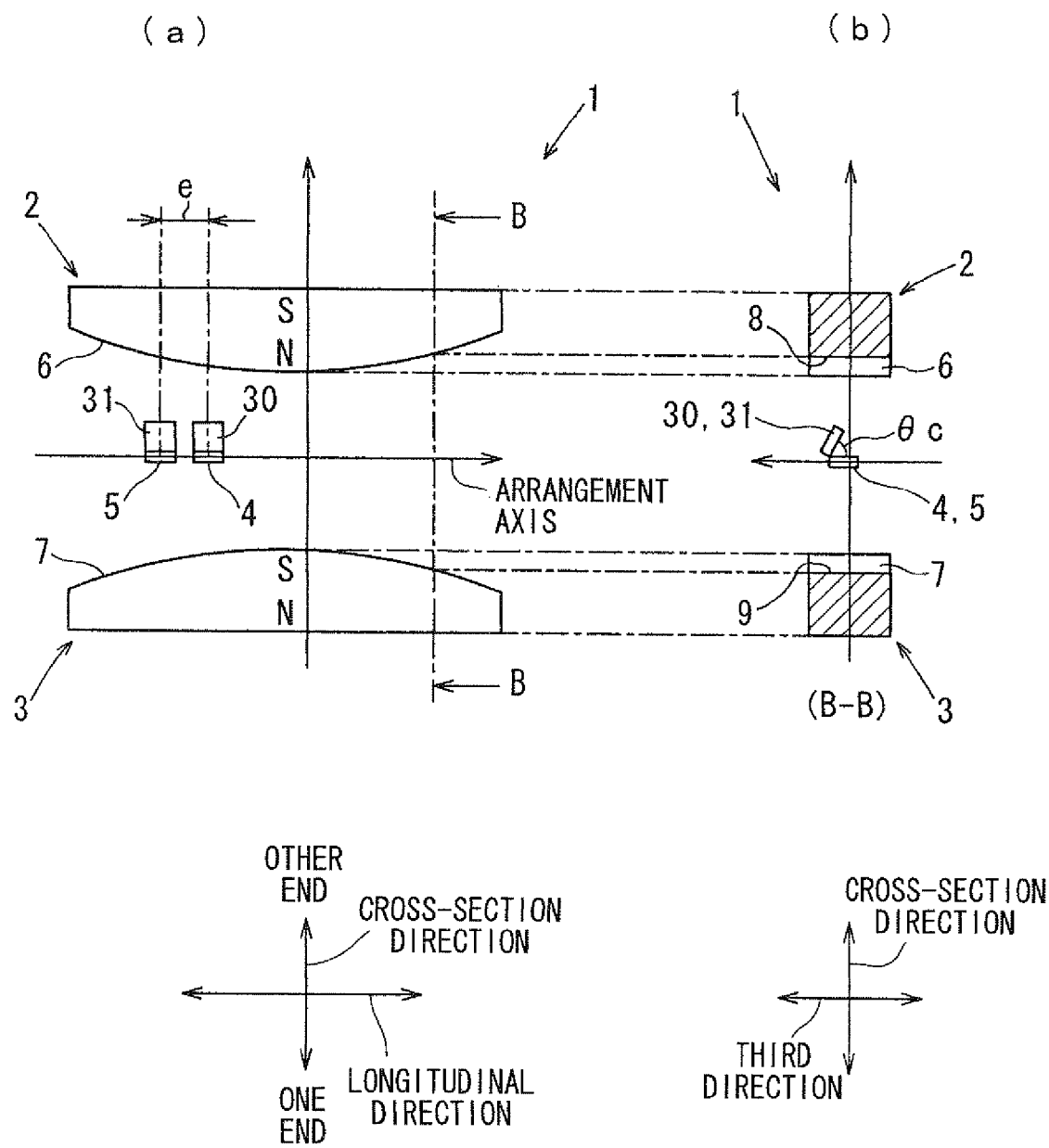
FIG. 11 is a schematic construction diagram showing a stroke sensor according to a fourth embodiment of the present invention.

In the stroke sensor 1 according to the fourth embodiment, another magnetism sensitive section 30 different from the magnetism sensitive sections 4, 5 is arranged at substantially the same position as the magnetism sensitive section 4 on the arrangement axis, and yet another magnetism sensitive section 31 different from the another magnetism sensitive section 30 is arranged at substantially the same position as the magnetism sensitive section 5 on the arrangement axis as shown in part (a) of FIG. 11.

Part (b) of FIG. 11 shows a cross section of the stroke sensor 1 of part (a) of FIG. 11 taken along the line B-B. As shown in part (b) of FIG. 11, the magnetism sensitive sections 4, 30 are arranged to form an angle θc smaller than 90° between magnetism sensitive surfaces thereof. The magnetism sensitive sections 5, 31 are arranged to form the angle θc smaller than 90° between magnetism sensitive surfaces thereof. The magnetism sensitive sections 4, 5 are arranged such that the magnetism sensitive surfaces thereof are in the same direction. The magnetism sensitive sections 30, 31 are arranged such that the magnetism sensitive surfaces thereof are in the same direction. The group of the magnetism sensitive sections 4, 30 and the group of the magnetism sensitive sections 5, 31 are arranged to be distant from each other by a distance e shorter than the distance d/2 on the arrangement axis. The magnetism sensitive sections 4, 5, 30, 31 are compatible Hall elements having the identical performance and the identical characteristics.

The sensed body is displaced linearly and rotates. The magnets 2, 3 are displaced in the longitudinal direction relative to the magnetism sensitive sections 4, 5, 30, 31 in accordance with the linear displacement of the sensed body. The magnets 2, 3 also rotate relative to the magnetism sensitive sections 4, 5, 30, 31 in accordance with the rotation of the sensed body.

Figure 12:
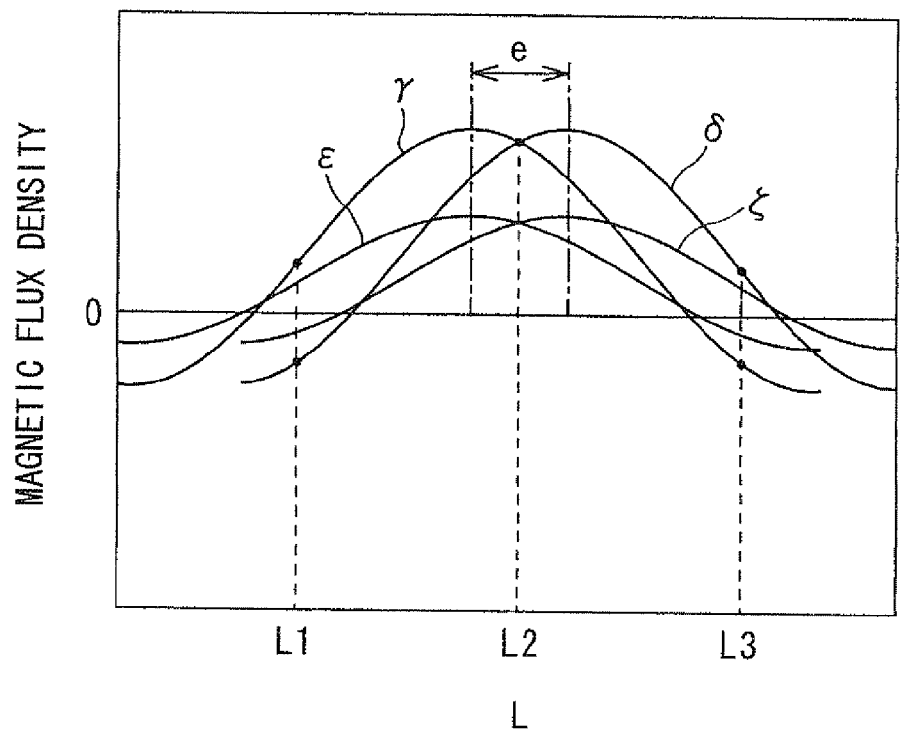
FIG. 12 is a characteristic diagram showing a correlation between a stroke amount and a magnetic flux density obtained directly based on an electric output of a magnetism sensitive section according to the fourth embodiment.

With the above construction, when the rotation angle θ is 0°, correlations between the stroke amount L of the magnets 2, 3 in the longitudinal direction and the magnetic flux densities obtained directly based on the electric outputs of the magnetism sensitive sections 4, 5 substantially coincide with sine curves obtained by adding an offset to sine functions having a phase difference e therebetween, for example, as shown by characteristic lines γ, δ in FIG. 12. A correlation between the stroke amount L and the magnetic flux densities obtained directly based on the electric outputs of the magnetism sensitive sections 30, 31 substantially coincide with sine curves obtained by adding an offset to sine functions having a phase difference e therebetween, for example, as shown by characteristic lines ε, ζ in FIG. 12.

That is, the characteristic lines γ, δ and the characteristic lines ε, ζ substantially coincide with sine curves obtained by adding an offset to sine functions, each of which uses the stroke amount L as a variable. The characteristic lines δ, ζ coincide with lines obtained by performing parallel translation of the characteristic lines γ, ε by a distance e respectively. The characteristic lines γ, δ have the same amplitude. The characteristic lines ε, ζ have the same amplitude. A magnitude relation between the amplitude of the characteristic lines γ, δ and the amplitude of the characteristic lines ε, ζ changes in accordance with the rotation angle θ as explained later.

Figure 13:
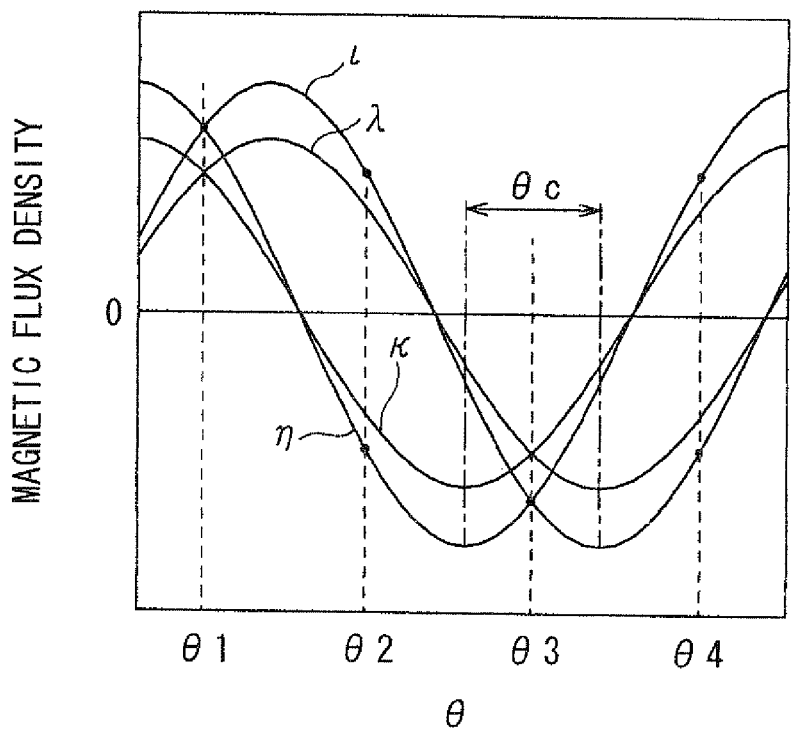
FIG. 13 is a characteristic diagram showing a correlation between a rotation angle and the magnetic flux density obtained directly based on the electric output of the magnetism sensitive section according to the fourth embodiment.

When the stroke amount L is 0, correlations between the rotation angle θ of the magnets 2, 3 and the magnetic flux densities obtained directly based on the electric outputs of the magnetism sensitive sections 4, 30 substantially coincide with sine curves having a phase difference θc therebetween, for example, as shown by characteristic lines η, ι in FIG. 13. Correlations between the rotation angle θ and the magnetic flux densities obtained directly based on the electric outputs of the magnetism sensitive sections 5, 31 substantially coincide with sine curves having a phase difference θc therebetween, for example, as shown by characteristic lines κ, λ in FIG. 13.

That is, the characteristic lines η, ι and the characteristic lines κ, λ substantially coincide with the sine curves, each of which uses the rotation angle θ as a variable. The characteristic lines ι, λ coincide with lines obtained by performing parallel translation of the characteristic lines η, κ by a distance θc respectively. The characteristic lines η, ι have the same amplitude. The characteristic lines κ, λ have the same amplitude. A magnitude relation between the amplitude of the characteristic lines η, ι and the amplitude of the characteristic lines κ, λ changes in accordance with the stroke amount L as explained later.

Figure 14A:
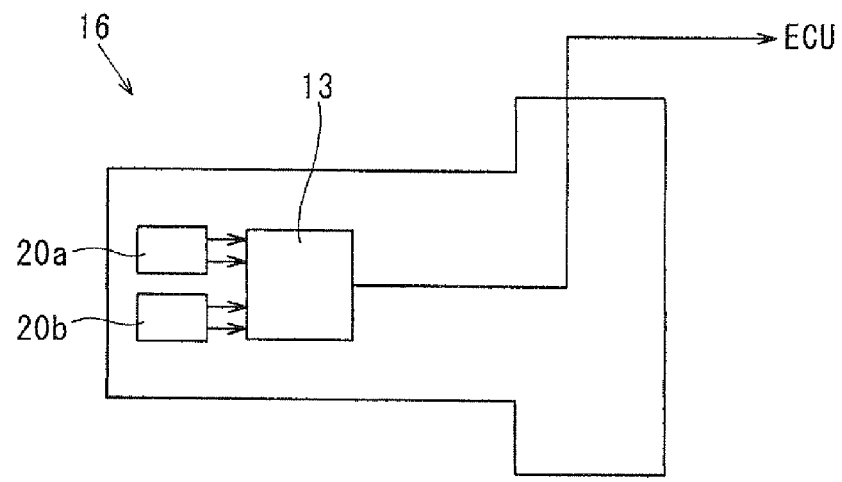
FIG. 14A is a schematic construction diagram showing a sensor assembly of the stroke sensor according to the fourth embodiment.
Figure 14B:
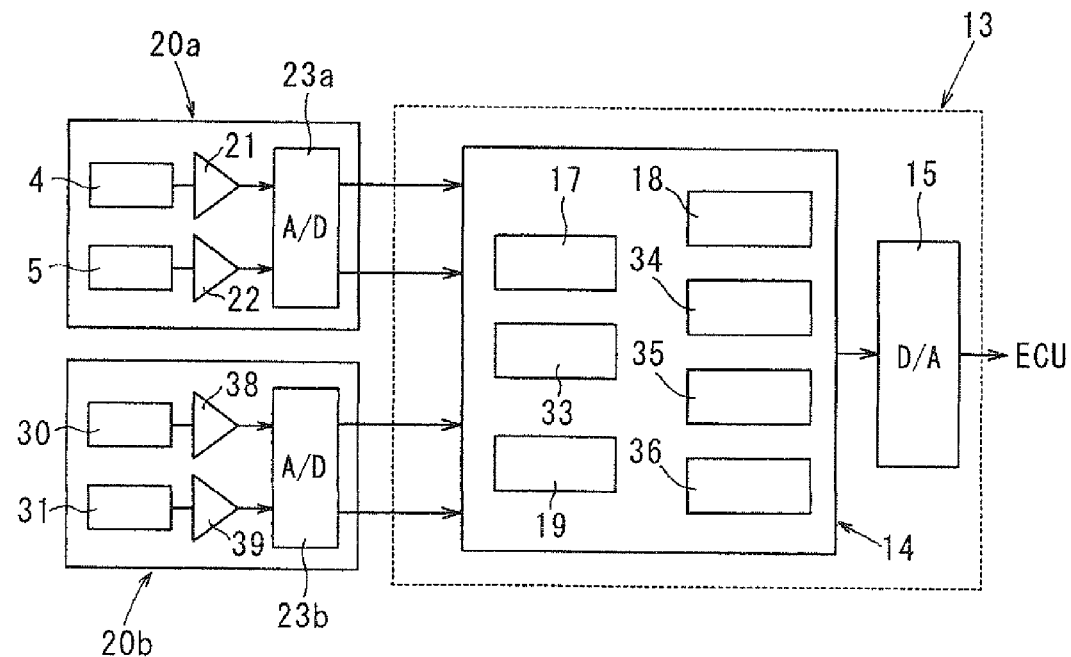
FIG. 14B is a schematic construction diagram showing a chip included in the sensor assembly according to the fourth embodiment.

The magnetism sensitive sections 4, 5, 30, 31 are Hall elements. As shown in FIGS. 14A and 14B, the magnetism sensitive sections 4, 5 are included in a single chip 20a, and the magnetism sensitive sections 30, 31 are included in another single chip 20b different from the chip 20a. A sensor assembly 16 has an arithmetic circuit 13 in addition to the chips 20a, 20b. Like the first embodiment, the arithmetic circuit 13 has a DSP 14, a D/A converter 15 and the like.

The DSP 14 according to the fourth embodiment has functions of a first offset adjusting device 17, a first inverse trigonometric function calculating device 18, a second offset adjusting device 33 (explained later) and second to fourth inverse trigonometric function calculating devices 34, 35, 36 (explained later).

The chip 20a has functions of operational amplifiers 21, 22 and a function of an A/D converter 23a that applies digital processing to output signals amplified by the operational amplifiers 21, 22. The output signals having undergone the digital processing are outputted to the arithmetic circuit 13. The chip 20b has functions of operational amplifiers 38, 39, which amplify the output signals from the magnetism sensitive sections 30, 31 respectively, and a function of an ND converter 23b, which applies digital processing to output signals amplified by the operational amplifiers 38, 39. The output signals having undergone the digital processing are outputted to the arithmetic circuit 13.

The second offset adjusting device 33 subtracts an offset amount from the respective electric outputs obtained from the magnetism sensitive sections 30, 31. For example, the second offset adjusting device 33 uses a numerical value equivalent to an intermediate value between the maximum and the minimum of the magnetic flux densities in the characteristic lines ϵ, ζ as the offset amount and subtracts the offset amount from the magnetic flux densities directly obtained based on the electric outputs of the magnetism sensitive sections 30, 31. The intermediate value is calculated as a weighted average of the maximum and the minimum, for example.

Like the first embodiment, the first offset adjusting device 17 subtracts an offset amount from the respective electric outputs obtained from the magnetism sensitive sections 4, 5. That is, the first offset adjusting device 17 according to the fourth embodiment uses a numerical value equivalent to an intermediate value between the maximum and the minimum of the magnetic flux densities in the characteristic lines γ, δ as the offset amount and subtracts the offset amount from the magnetic flux densities directly obtained based on the electric outputs of the magnetism sensitive sections 4, 5.

Figure 15:
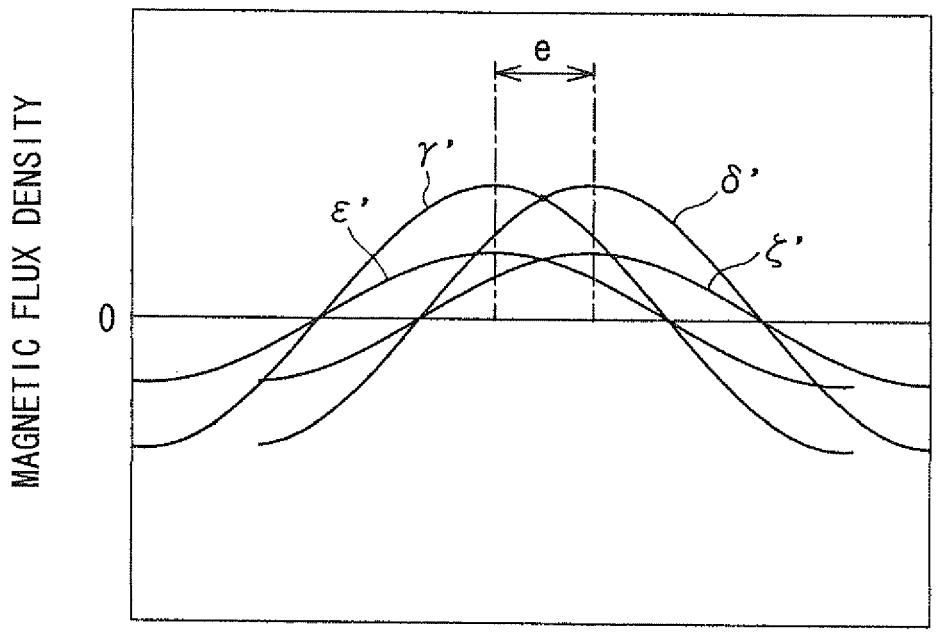
FIG. 15 is a characteristic diagram showing a correlation between the stroke amount and the magnetic flux density after offset adjustment according to the fourth embodiment.

If the characteristic lines ϵ, δ shown in FIG. 12 undergo the processing of the first offset adjusting device 17, the characteristic lines γ, δ change into characteristic lines γ', δ' substantially coinciding with sine functions, each of which uses the stroke amount L as a variable, respectively as shown in FIG. 15. If the characteristic lines ϵ, ζ undergo the processing of the second offset adjusting device 33, the characteristic lines ϵ, ζ change into characteristic lines ϵ', ζ' substantially coinciding with sine functions, each of which uses the stroke amount L as a variable, respectively.

The characteristic lines γ', δ' are the two sine functions having a phase difference e therebetween. The characteristic line δ' coincides with a line obtained by performing parallel translation of the characteristic line γ' by the distance e. The characteristic lines γ'', δ' have the same amplitude. Likewise, the characteristic lines ϵ', ζ' are the two sine functions having a phase difference e therebetween. The characteristic line ζ' coincides with a line obtained by performing parallel translation of the characteristic line ϵ' by the distance e. The characteristic lines ϵ', ζ' have the same amplitude.

Therefore, the output voltages Vc, Vd obtained by performing the amplification and the offset adjustment of the Hall voltages outputted from the magnetism sensitive sections 4, 5 are expressed by following Expressions 8 and 9 as approximate expressions by using respective amplitudes Ec, Ed and by using the stroke amount L as a variable.

$$Vc = Ec \cdot \sin L \quad \text{(Expression 8)}$$

$$Vd = Ed \cdot \sin(L-e) \quad \text{(Expression 9)}$$

The output voltages Ve, Vf obtained by performing the amplification and the offset adjustment of the Hall voltages outputted from the magnetism sensitive sections 30, 31 are expressed by following Expressions 10 and 11 as approximate expressions by using respective amplitudes Ee, Ef and by using the stroke amount L as a variable.

$$Ve = Ee \cdot \sin L \quad \text{(Expression 10)}$$

$$Vf = Ef \cdot \sin(L-e) \quad \text{(Expression 11)}$$

Like the amplitudes Ea, Eb of the first embodiment, the amplitudes Ec, Ed are equal to each other, and the amplitudes Ee, Ef are equal to each other. Therefore, for example, the temperature characteristics of the magnetic flux and the temperature characteristics of the electric outputs can be cancelled by calculating a difference (Vc−Vd) and a sum (Vc+Vd) of the output voltages Vc, Vd and by dividing the difference (Vc−Vd) by the sum (Vc+Vd). The temperature characteristics of the magnetic flux and the temperature characteristics of the electric outputs can be cancelled also by calculating a difference (Ve−Vf) and a sum (Ve+Vf) of the output voltages Ve, Vf and by dividing the difference (Ve−Vf) by the sum (Ve+Vf).

Further, a numerical value equivalent to a tangent that uses the stroke amount L as a variable can be obtained from the numerical value obtained by the division. By applying the inverse trigonometric function processing to the obtained tangent, following Expressions 12 and 13 of the stroke amount L can be obtained.

$$L = \arctan[\cot\{e/2 \cdot \pi/d \cdot (Vc-Vd)/(Vc+Vd)\}] \quad \text{(Expression 12)}$$

$$L = \arctan[\cot\{e/2 \cdot \pi/d \cdot (Ve-Vf)/(Ve+Vf)\}] \quad \text{(Expression 13)}$$

The first inverse trigonometric function calculating device 18 performs arithmetic processing equivalent to Expression 12 by applying the inverse trigonometric function calculation to a numerical value obtained by using the two calculated values (output voltages Vc, Vd) obtained from the first offset adjusting device 17. The first inverse trigonometric function calculating device 18 applies arithmetic processing equivalent to following Expression 14 to the numerical value obtained by the inverse trigonometric function calculation and defines the numerical value obtained by the arithmetic processing as an output value V(L) of the stroke amount L.

$$V(L) = \arctan[\cot\{e/2 \cdot \pi d \cdot (Vc-Vd)/(Vc+Vd)\}] \cdot d/\pi \quad \text{(Expression 14)}$$

The third inverse trigonometric function calculating device 35 performs arithmetic processing equivalent to Expression 13 by applying the inverse trigonometric function calculation to a numerical value obtained by using the two calculated values (output voltages Ve, Vf) obtained from the second offset adjusting device 33. The third inverse trigonometric function calculating device 35 applies arithmetic processing equivalent to following Expression 15 to the numerical value obtained by the inverse trigonometric function calculation and defines the numerical value obtained by the arithmetic processing as an output value V(L) of the stroke amount L.

$$V(L) = \arctan[\cot\{e/2 \cdot \pi/d \cdot (Ve-Vf)/(Ve+Vf)\}] \cdot d/\pi \quad \text{(Expression 15)}$$

Thus, by using the Hall voltages outputted from the magnetism sensitive sections 4, 5 (equivalent to magnetic flux densities shown by characteristic lines γ, δ), the output value V(L) with respect to the stroke amount L can be made into an ideal linear characteristic in an actually used range of the stroke amount L like FIG. 6. Also by using the Hall voltages outputted from the magnetism sensitive sections 30, 31 (equivalent to magnetic flux densities shown by characteristic lines ϵ, ζ), the output value V(L) with respect to the stroke amount L can be made into an ideal linear characteristic in an actually used range of the stroke amount L like FIG. 6.

Output voltages Vg, Vh obtained without applying the processing of the first and second offset adjusting devices 17, 33 to the Hall voltages, which are outputted from the magnetism sensitive sections 4, 30 and are amplified, are expressed by following Expressions 16 and 17 as approximate expressions by using respective amplitudes Eg, Eh and, by using the rotation angle θ as a variable.

$$Vg = Eg \cdot \sin\theta \quad \text{(Expression 16)}$$

$$Vh = Eh \cdot \sin(\theta - \theta c) \quad \text{(Expression 17)}$$

Output voltages Vi, Vj obtained without applying the processing of the first and second offset adjusting devices 17, 33 to the Hall voltages, which are outputted from the magnetism sensitive sections 5, 31 and are amplified, are expressed by following Expressions 18 and 19 as approximate expressions by using respective amplitudes Ei, Ej and by using the rotation angle θ as a variable.

$$Vi = Ei \cdot \sin\theta \quad \text{(Expression 18)}$$

$$Vj = Ej \cdot \sin(\theta - \theta c) \quad \text{(Expression 19)}$$

Like the amplitudes Ea, Eb of the first embodiment, the amplitudes Eg, Eh are equal to each other, and the amplitudes Ei, Ej are equal to each other. Therefore, for example, the temperature characteristics of the magnetic flux and the temperature characteristics of the electric outputs can be cancelled by calculating a difference (Vg−Vh) and a sum (Vg+Vh) of the output voltages Vg, Vh and by dividing the difference (Vg−Vh) by the sum (Vg+Vh). The temperature characteristics of the magnetic flux and the temperature characteristics of the electric outputs can be cancelled also by calculating a difference (Vi−Vj) and a sum (Vi+Vj) of the output voltages Vi, Vj and by dividing the difference (Vi−Vj) by the sum (Vi+Vj).

Further, a numerical value equivalent to a tangent that uses the rotation angle θ as a variable can be obtained from the numerical value obtained by the division. By applying the inverse trigonometric function processing to the obtained tangent, following Expressions 20 and 21 of the rotation angle θ can be obtained.

$$\theta = \arctan[\cot\{\theta c/2 \cdot \pi/180° \cdot (Vg-Vh)/(Vg+Vh)\}] \quad \text{(Expression 20)}$$

$$\theta = \arctan[\cot\{\theta c/2 \cdot \pi/180° \cdot (Vi-Vj)/(Vi+Vj)\}] \quad \text{(Expression 21)}$$

The second inverse trigonometric function calculating device 34 performs arithmetic processing equivalent to Expression 20 by applying the inverse trigonometric function calculation to the numerical values (output voltages Vg, Vh) obtained by using the Hall voltages of the magnetism sensitive sections 4, 30. The second inverse trigonometric function calculating device 34 applies arithmetic processing equivalent to following Expression 22 to the numerical value obtained by the inverse trigonometric function calculation and defines the numerical value obtained by the arithmetic processing as an output value V(θ) of the rotation angle θ.

$$V(\theta) = \arctan[\cot\{\theta c/2 \cdot \pi/180° \cdot (Vg-Vh)/(Vg+Vh)\}] \cdot 180°/\pi \quad \text{(Expression 22)}$$

The fourth inverse trigonometric function calculating device 36 performs arithmetic processing equivalent to Expression 21 by applying the inverse trigonometric function calculation to the numerical values (output voltages Vi, Vj) obtained by using the Hall voltages of the magnetism sensitive sections 5, 31. The fourth inverse trigonometric function calculating device 36 applies arithmetic processing equivalent to following Expression 23 to the numerical value obtained by the inverse trigonometric function calculation and defines the numerical value obtained by the arithmetic processing as an output value V(θ) of the rotation angle θ.

$$V(\theta) = \arctan[\cot\{\theta c/2 \cdot \pi/180° \cdot (Vi-Vj)/(Vi+Vj)\}] \cdot 180°/\pi \quad \text{(Expression 23)}$$

Figure 16:
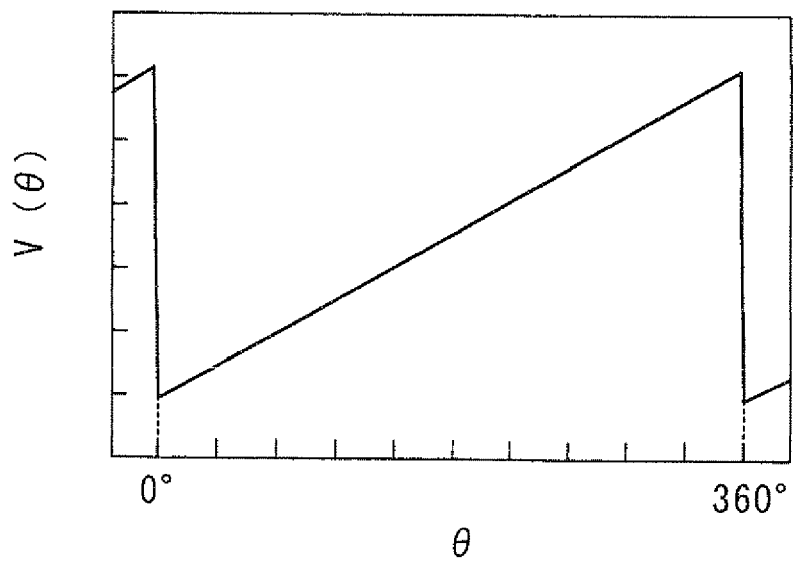
FIG. 16 is a characteristic diagram showing a correlation between the rotation angle and an output value concerning the rotation angle according to the fourth embodiment.

Thus, by using the Hall voltages outputted from the magnetism sensitive sections 4, 30 (equivalent to magnetic flux densities shown by characteristic lines η, ι), the output value V(θ) with respect to the rotation angle θ can be made into an ideal linear characteristic in the range of the rotation angle θ from 0° to 360° as shown in FIG. 16. Likewise, by using the Hall voltages outputted from the magnetism sensitive sections 5, 31 (equivalent to magnetic flux densities shown by characteristic lines κ, λ), the output value V(θ) with respect to the rotation angle θ can be made into an ideal linear characteristic in the range of the rotation angle θ from 0° to 360° as shown in FIG. 16.

Concerning the sensing of the stroke amount L, the DSP 14 according to the fourth embodiment calculates the output value V(L) by selecting either one of a combination (first combination) of the output voltages Vc, Vd obtained from the magnetism sensitive sections 4, 5 and a combination (third combination) of the output voltages ye, Vf obtained from the magnetism sensitive sections 30, 31. That is, the DSP 14 calculates the output value V(L) by selecting the group of the first offset adjusting device 17 and the first inverse trigonometric function calculating device 18 or the group of the second offset adjusting device 33 and the third inverse trigonometric function calculating device 35.

Concerning the sensing of the rotation angle θ, the DSP 14 calculates the output value V(θ) by selecting either one of a combination (second combination) of the output voltages Vg, Vh obtained from the magnetism sensitive sections 4, 30 and a combination (fourth combination) of the output voltages Vi, Vj obtained from the magnetism sensitive sections 5, 31. That is, the DSP 14 calculates the output value V(θ) by selecting the second inverse trigonometric function calculating device 34 or the fourth inverse trigonometric function calculating device 36.

The magnetic flux formed by the magnets 2, 3 is unique one that provides the correlation between the magnetic flux density on the arrangement axis and the coordinate of the arrangement axis substantially coinciding with the sine curve. Therefore, the magnetic flux densities respectively sensed by the magnetism sensitive sections 4, 5, 30, 31 differ from each other according to the stroke amount L and the rotation angle θ. Therefore, when the DSP 14 senses the stroke amount L, the DSP 14 calculates the output value V(L) by selecting a combination that provides a higher sensed magnetic flux density between the first and third combinations based on the rotation angle θ in order to increase an S/N ratio with respect to the output value V(L).

For example, numerical values of the rotation angle θ at the time when an absolute value of the magnetic flux density of the characteristic line η (magnetic flux density obtained directly based on electric output of magnetism sensitive section 4) coincides with an absolute value of the magnetic flux density of the characteristic line ι (magnetic flux density obtained directly based on electric output of magnetism sensitive section 30) are defined as values θ1 to θ4 as shown in FIG. 13. In this case, in a range where the rotation angle θ is smaller than θ1, the absolute value of the magnetic flux density of the characteristic line η is larger than that of the characteristic line ι. Therefore, the magnetic flux density sensed by the magnetism sensitive section 4 is higher than the magnetic flux density sensed by the magnetism sensitive section 30.

Figure 17A:
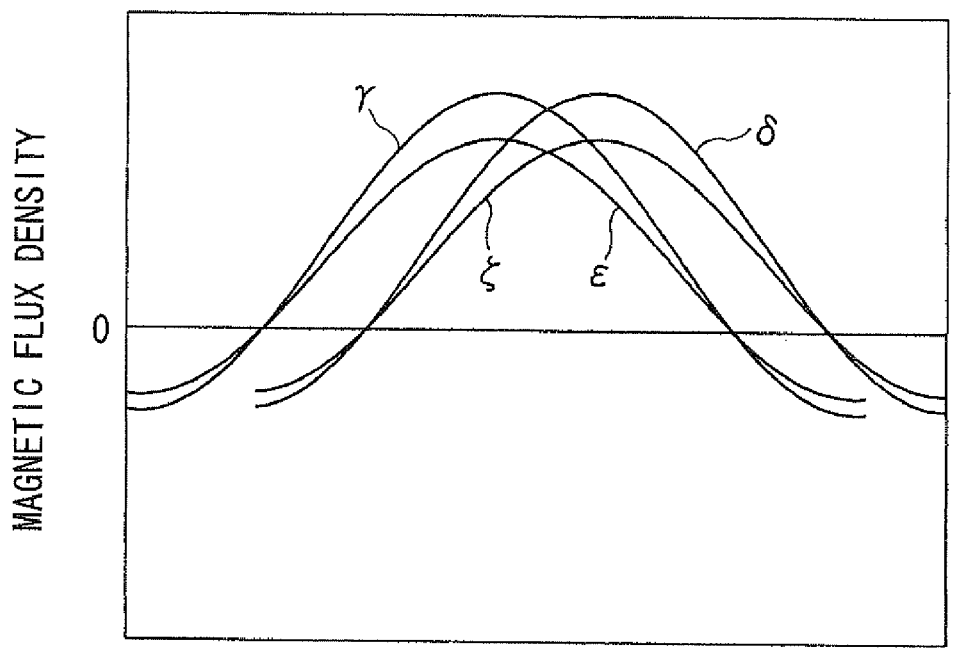
FIG. 17A is a characteristic diagram showing a correlation between the stroke amount and the magnetic flux density obtained directly based on the electric output of the magnetism sensitive section according to the fourth embodiment.
Figure 17B:
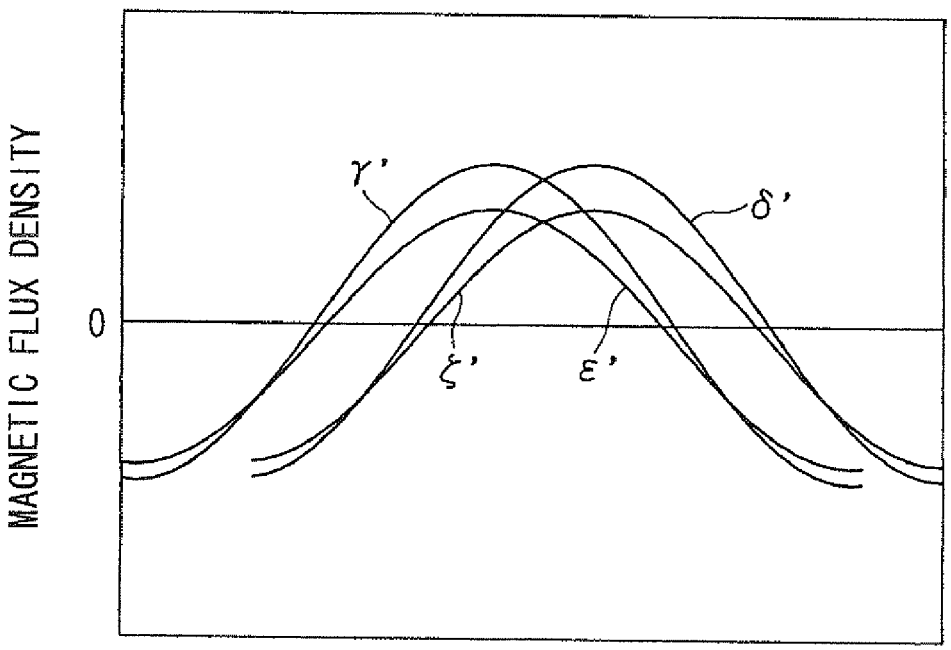
FIG. 17B is a characteristic diagram showing a correlation between the stroke amount and the magnetic flux density after the offset adjustment according to the fourth embodiment.

Therefore, the amplitude of the characteristic line γ (correlation between magnetic flux density obtained directly based on electric output of magnetism sensitive section 4 and stroke amount L) is larger than the amplitude of the characteristic line ε (correlation between magnetic flux density obtained directly based on electric output of magnetism sensitive section 30 and stroke amount L), for example, as shown in FIGS. 17A and 17B. Therefore, the DSP 14 selects the first combination for sensing the stroke amount L when the rotation angle θ is smaller than θ1 and calculates the output value V(L) by the first offset adjusting device 17 and the first inverse trigonometric function calculating device 18.

Figure 18A:
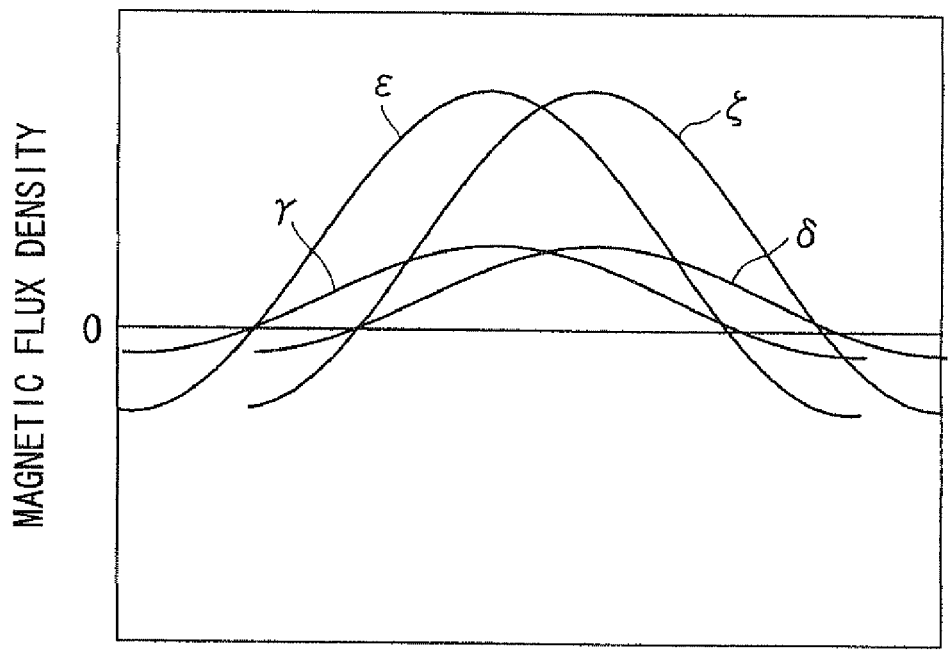
FIG. 18A is a characteristic diagram showing a correlation between the stroke amount and the magnetic flux density obtained directly based on the electric output of the magnetism sensitive section according to the fourth embodiment.
Figure 18B:
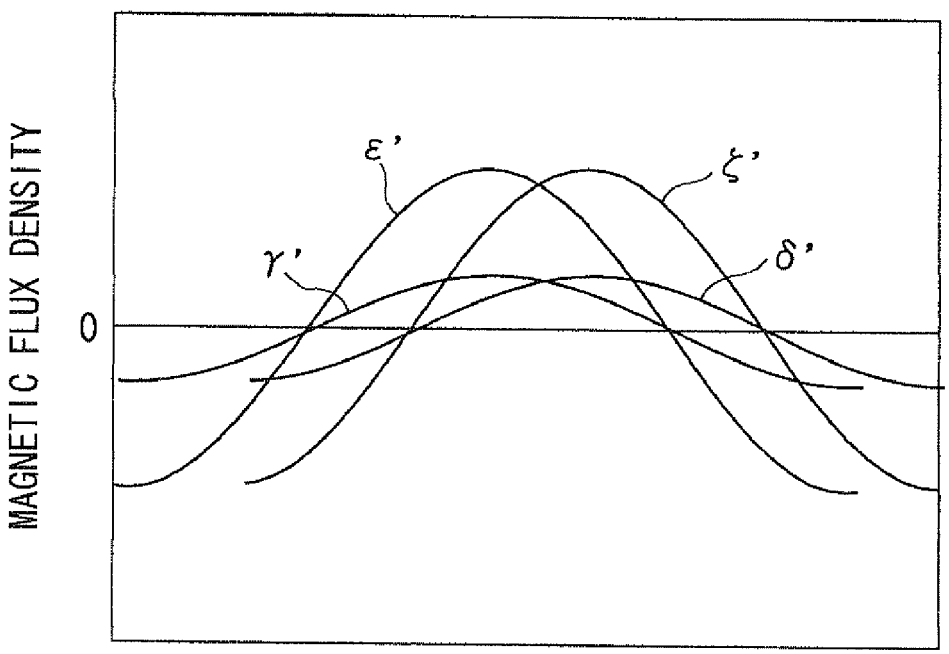
FIG. 18B is a characteristic diagram showing a correlation between the stroke amount and the magnetic flux density after the offset adjustment according to the fourth embodiment.

In a range where the rotation angle θ is larger than θ1 and is smaller than θ2, the absolute value of the magnetic flux density of the characteristic line ι is larger than that of the characteristic line η. Therefore, the magnetic flux density sensed by the magnetism sensitive section 30 is higher than the magnetic flux density sensed by the magnetism sensitive section 4. Therefore, the amplitude of the characteristic line ε becomes larger than the amplitude of the characteristic line γ, for example, as shown in FIGS. 18A and 18B. Therefore, the DSP 14 selects the third combination for sensing the stroke amount L when the rotation angle θ is larger than θ1 and is smaller than θ2 and calculates the output value V(L) by the second offset adjusting device 33 and the third inverse trigonometric function calculating device 35.

Figure 19A:
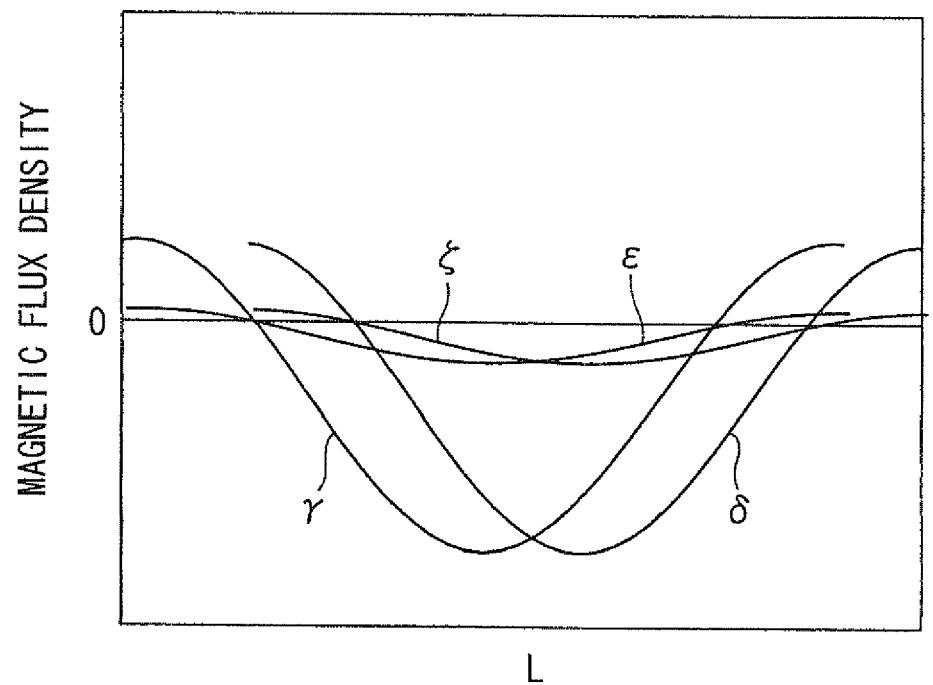
FIG. 19A is a characteristic diagram showing a correlation between the stroke amount and the magnetic flux density obtained directly based on the electric output of the magnetism sensitive section according to the fourth embodiment.
Figure 19B:
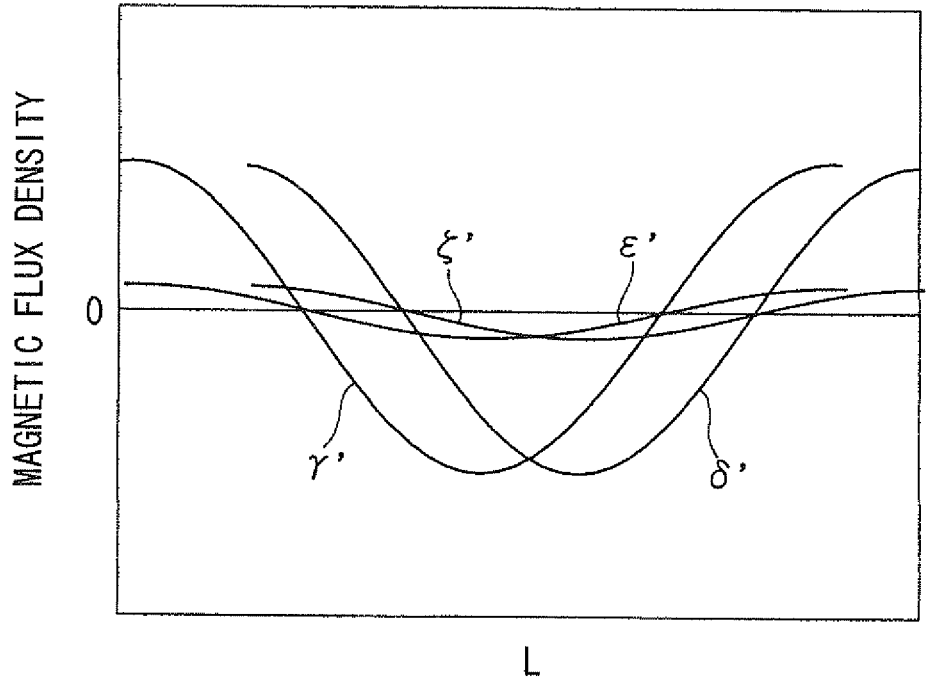
FIG. 19B is a characteristic diagram showing a correlation between the stroke amount and the magnetic flux density after the offset adjustment according to the fourth embodiment.

In a range where the rotation angle θ is larger than θ2 and is smaller than θ3, the absolute value of the magnetic flux density of the characteristic line η is larger than that of the characteristic line ι. Therefore, the magnetic flux density sensed by the magnetism sensitive section 4 is higher than the magnetic flux density sensed by the magnetism sensitive section 30. Therefore, the amplitude of the characteristic line γ becomes larger than the amplitude of the characteristic line ε, for example, as shown in FIGS. 19A and 19B. Therefore, the DSP 14 selects the first combination for sensing the stroke amount L when the rotation angle θ is larger than θ2 and is smaller than θ3 and calculates the output value V(L) by the first offset adjusting device 17 and the first inverse trigonometric function calculating device 18.

In a range where the rotation angle θ is larger than θ3 and is smaller than θ4, the absolute value of the magnetic flux density of the characteristic line ι is larger than that of the characteristic line η. Therefore, the magnetic flux density sensed by the magnetism sensitive section 30 is higher than the magnetic flux density sensed by the magnetism sensitive section 4. Therefore, the amplitude of the characteristic line E becomes larger than the amplitude of the characteristic line γ. Therefore, the DSP 14 selects the third combination for sensing the stroke amount L when the rotation angle θ is larger than θ3 and is smaller than θ4 and calculates the output value V(L) by the second offset adjusting device 33 and the third inverse trigonometric function calculating device 35.

In a range where the rotation angle θ is larger than θ4, the absolute value of the magnetic flux density of the characteristic line η is larger than that of the characteristic line ι. Therefore, the magnetic flux density sensed by the magnetism sensitive section 4 is higher than the magnetic flux density sensed by the magnetism sensitive section 30. Therefore, the amplitude of the characteristic line γ becomes larger than the amplitude of the characteristic line ε. Therefore, the DSP 14 selects the first combination for sensing the stroke amount L when the rotation angle θ is larger than θ4 and calculates the output value V(L) by the first offset adjusting device 17 and the first inverse trigonometric function calculating device 18.

When the rotation angle θ is one of the angles θ1 to θ4, the absolute value of the magnetic flux density of the characteristic line κ (magnetic flux density obtained directly based on electric output of magnetism sensitive section 5) coincides with the absolute value of the magnetic flux density of the characteristic line λ (magnetic flux density obtained directly based on electric output of magnetism sensitive section 31). The magnitude relation between the absolute values of the characteristic lines κ, λ is similar to the magnitude relation between the absolute values of the characteristic lines η, ι.

Therefore, the magnitude relation between the amplitude of the characteristic line δ (correlation between magnetic flux density obtained directly based on electric output of magnetism sensitive section 5 and stroke amount L) and the amplitude of the characteristic line ζ (correlation between magnetic flux density obtained directly based on electric output of magnetism sensitive section 31 and stroke amount L) is similar to the magnitude relation between the amplitude of the characteristic line γ and the amplitude of the characteristic line ε (refer to FIGS. 17A to 19B). A selection result in the case where the first or third combination is selected in accordance with the magnitude relation between the absolute values of the characteristic lines κ, λ coincides with the selection result in the case where the selection is performed based on the magnitude relation between the absolute values of the characteristic lines η, ι.

When the DSP 14 senses the rotation angle θ, the DSP 14 calculates the output value V(θ) by selecting a combination that provides a higher sensed magnetic flux density between the second and fourth combinations based on the stroke amount L in order to increase the S/N ratio with respect to the output value V(θ).

For example, as shown in FIG. 12, the numerical values of the stroke amount L at the time when the absolute value of the magnetic flux density of the characteristic line γ (magnetic flux density obtained directly based on electric output of magnetism sensitive section 4) coincides with the absolute value of the magnetic flux density of the characteristic line δ (magnetic flux density obtained directly based on electric output of magnetism sensitive section 5) are defined as values L1, L2 and L3.

In this case, in a range where the stroke amount L is smaller than L1, the absolute value of the magnetic flux density of the characteristic line δ is larger than that of the characteristic line γ. Therefore, the magnetic flux density sensed by the magnetism sensitive section 5 is higher than the magnetic flux density sensed by the magnetism sensitive section 4.

Figure 20:
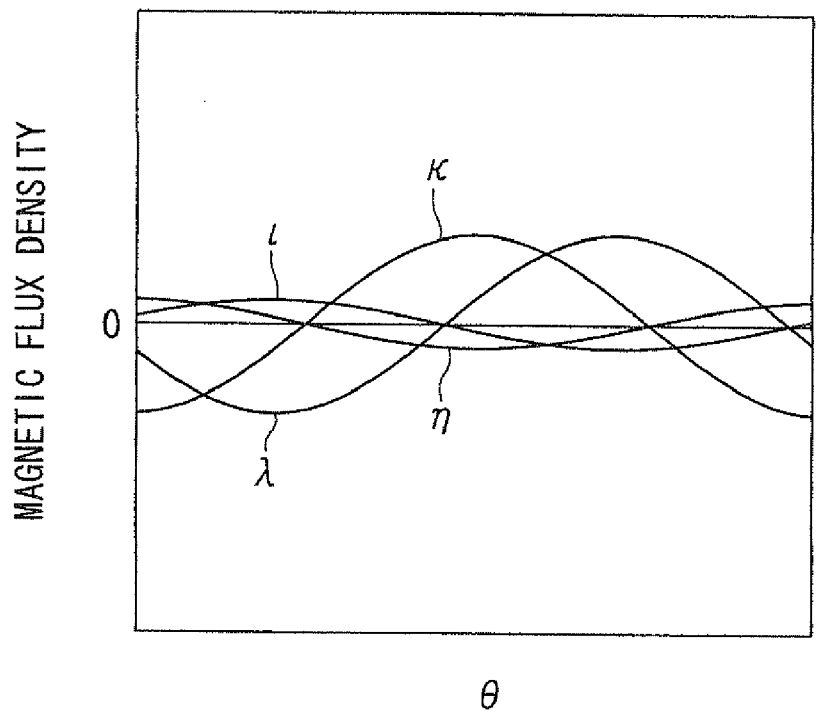
FIG. 20 is a characteristic diagram showing a correlation between the rotation angle and the magnetic flux density obtained directly based on the electric output of the magnetism sensitive section according to the fourth embodiment.

Therefore, for example, as shown in FIG. 20, the amplitude of the characteristic line κ (correlation between magnetic flux density obtained directly based on electric output of magnetism sensitive section 5 and rotation angle θ) becomes larger than the amplitude of the characteristic line η (correlation between magnetic flux density obtained directly based on electric output of magnetism sensitive section 4 and rotation angle θ). Therefore, the DSP 14 selects the fourth combination for sensing the rotation angle θ when the stroke amount L is smaller than L1 and calculates the output value V(θ) by the fourth inverse trigonometric function calculating device 36.

Figure 21:
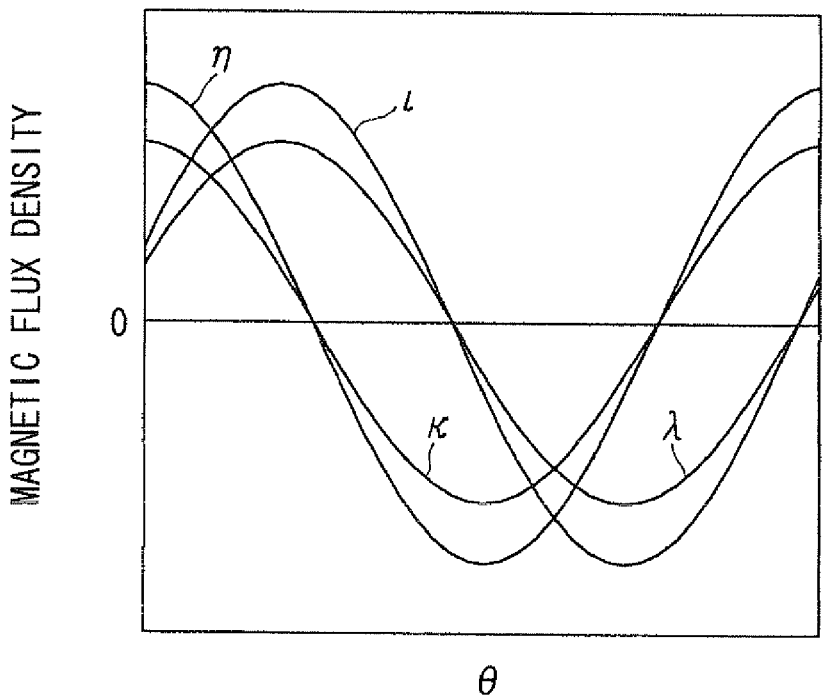
FIG. 21 is a characteristic diagram showing a correlation between the rotation angle and the magnetic flux density obtained directly based on the electric output of the magnetism sensitive section according to the fourth embodiment.
Figure 22:
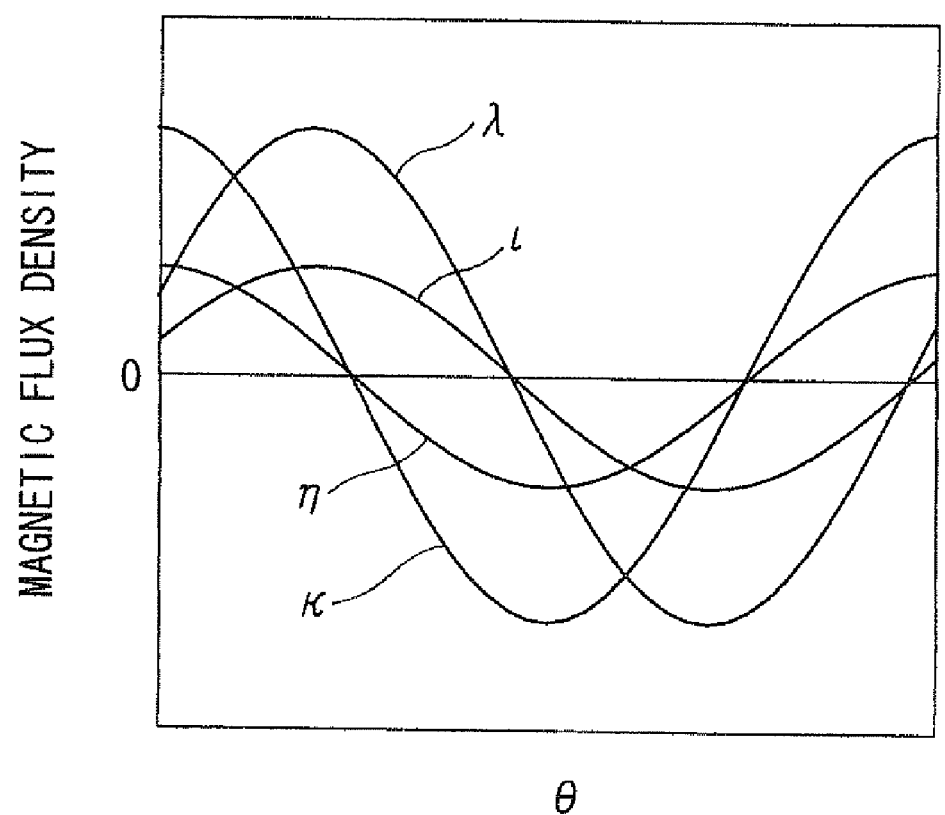
FIG. 22 is a characteristic diagram showing a correlation between the rotation angle and the magnetic flux density obtained directly based on the electric output of the magnetism sensitive section according to the fourth embodiment.

In a range where the stroke amount L is larger than L1 and is smaller than L2, the absolute value of the magnetic flux density of the characteristic line γ is larger than that of the characteristic line δ. Therefore, the magnetic flux density sensed by the magnetism sensitive section 4 is higher than the magnetic flux density sensed by the magnetism sensitive section 5. Therefore, the amplitude of the characteristic line η becomes larger than the amplitude of the characteristic line κ, for example, as shown in FIG. 21. Therefore, the DSP 14 selects the second combination and calculates the output value V(θ) by the second inverse trigonometric function calculating device 34 to sense the rotation angle θ when the stroke amount L is larger than L1 and is smaller than L2. In a range where the stroke amount L is larger than L2 and is smaller than L3, the absolute value of the magnetic flux density of the characteristic line δ is larger than that of the characteristic line γ. Therefore, the magnetic flux density sensed by the magnetism sensitive section 5 is higher than the magnetic flux density sensed by the magnetism sensitive section 4. Therefore, the amplitude of the characteristic line K becomes larger than the amplitude of the characteristic line η, for example, as shown in FIG. 22. Therefore, the DSP 14 selects the fourth combination and calculates the output value V(θ) by the fourth inverse trigonometric function calculating device 36 to sense the rotation angle θ when the stroke amount L is larger than L2 and is smaller than L3.

In a range where the stroke amount L is larger than L3, the absolute value of the magnetic flux density of the characteristic line γ is larger than that of the characteristic line δ. Therefore, the magnetic flux density sensed by the magnetism sensitive section 4 is higher than the magnetic flux density sensed by the magnetism sensitive section 5. Therefore, the amplitude of the characteristic line η becomes larger than the amplitude of the characteristic line κ. Therefore, the DSP 14 selects the second combination and calculates the output value V(θ) by the second inverse trigonometric function calculating device 34 to sense the rotation angle θ when the stroke amount L is larger than L3.

When the stroke amount L is one of L1 to L3, the absolute value of the magnetic flux density of the characteristic line ε (magnetic flux density obtained directly based on electric output of magnetism sensitive section 30) coincides with the absolute value of the magnetic flux density of the characteristic line ζ (magnetic flux density obtained directly based on electric output of magnetism sensitive section 31). The magnitude relation between the absolute values of the characteristic lines ε, ζ is similar to the magnitude relation between the absolute values of the characteristic lines γ, δ.

Therefore, the magnitude relation between the amplitude of the characteristic line ι (correlation between magnetic flux density obtained directly based on electric output of magnetism sensitive section 30 and rotation angle θ) and the amplitude of the characteristic line λ (correlation between magnetic flux density obtained directly based on electric output of magnetism sensitive section 31 and rotation angle θ) is similar to the magnitude relation between the amplitude of the characteristic line η and the amplitude of the characteristic line κ (refer to FIGS. 20 to 22). A selection result in the case where the second or fourth combination is selected in accordance with the magnitude relation between the absolute values of the characteristic lines ε, ζ coincides with the selection result in the case where the selection is performed based on the magnitude relation between the absolute values of the characteristic lines γ, δ.

(Effects of Fourth Embodiment)

In the stroke sensor 1 according to the fourth embodiment, the magnetism sensitive sections 30, 31 are arranged at substantially the same positions as the magnetism sensitive sections 4, 5 on the arrangement axis respectively. The magnetism sensitive sections 4, 30 are arranged to form the angle θc between the magnetism sensitive surfaces thereof. The magnetism sensitive sections 5, 31 are arranged to form the angle θc between the magnetism sensitive surfaces thereof.

The magnetism sensitive sections 4, 5 are arranged such that the magnetism sensitive surfaces thereof are in the same direction. The magnetism sensitive sections 30, 31 are arranged such that the magnetism sensitive surfaces thereof are in the same direction. The group of the magnetism sensitive sections 4, 30 and the group of the magnetism sensitive sections 5, 31 are arranged to be distant from each other by the distance e on the arrangement axis. The sensed body is displaced linearly and rotates. The magnets 2, 3 are displaced in the longitudinal direction relative to the magnetism sensitive sections 4, 5, 30, 31 in accordance with the stroke of the sensed body. The magnets 2, 3 also rotate relative to the magnetism sensitive sections 4, 5, 30, 31 in accordance with the rotation of the sensed body.

Thus, the correlations between the magnetic flux densities obtained directly based on the electric outputs of the magnetism sensitive sections 4, 5 and the stroke amount L substantially coincide with the sine curves obtained by adding the offset to the sine functions having the phase difference e therebetween. The correlations between the magnetic flux densities obtained directly based on the electric outputs of the magnetism sensitive sections 30, 31 and the stroke amount L substantially coincide with the sine curves obtained by adding the offset to the sine functions having the phase difference e therebetween (refer to FIG. 12).

The correlations between the magnetic flux densities obtained directly based on the electric outputs of the magnetism sensitive sections 4, 30 and the rotation angle θ substantially coincide with the sine curves having the phase difference θc therebetween. The correlations between the magnetic flux densities obtained directly based on the electric outputs of the magnetism sensitive sections 5, 31 and the rotation angle θ substantially coincide with the sine curves having the phase difference θc therebetween (refer to FIG. 13). Accordingly, the correlation between the output value V(L) of the stroke amount L and the stroke amount. L and the correlation between the output value V(θ) of the rotation angle θ and the rotation angle θ can be made into ideal linear characteristics (refer to FIGS. 6 and 16) by canceling the temperature characteristics of the magnetic flux and the electric outputs.

Thus, even if the magnetic flux or the electric outputs fluctuate in accordance with the temperature, highly accurate output values V(L), V(θ) can be obtained concerning both of the stroke amount L and the rotation angle θ. Thus, highly accurate sensing of both of the stroke amount L and the rotation angle θ can be performed by the single stroke sensor 1. Therefore, the improvement of the accuracy and the mountability and the cost reduction can be achieved at the same time.

As for the sensing of the stroke amount L, the output value V(L) can be calculated by selecting either one of the combination (first combination) of the electric outputs obtained from the magnetism sensitive sections 4, 5 and the combination (third combination) of the electric outputs obtained from the magnetism sensitive sections 30, 31. As for the sensing of the rotation angle θ, the output value V(θ) can be calculated by selecting either one of the combination (second combination) of the electric outputs obtained from the magnetism sensitive sections 4, 30 and the combination (fourth combination) of the electric outputs obtained from the magnetism sensitive sections 5, 31.

The magnetic flux formed by the magnets 2, 3 is unique one that provides the correlation between the magnetic flux density on the arrangement axis and the coordinate of the arrangement axis substantially coinciding with the sine curve. Therefore, the magnetic flux densities sensed by the magnetism sensitive sections 4, 5, 30, 31 differ from each other according to the stroke amount L and the rotation angle θ.

Therefore, when the stroke amount L is sensed, the S/N ratio with respect to the output value V(L) can be increased by selecting the combination that provides the higher sensed magnetic flux density between the first and third combinations based on the rotation angle θ. When the rotation angle θ is sensed, the S/N ratio with respect to the output value V(θ) can be increased by selecting the combination that provides the higher sensed magnetic flux density between the second and fourth combinations based on the stroke amount L. Thus, more accurate output values V(L), V(θ) can be obtained concerning both of the stroke amount L and the rotation angle θ.

The stroke sensor 1 according to the fourth embodiment has the magnetism sensitive sections 4, 5, 30, 31, which are the Hall elements. The magnetism sensitive sections 4, 5 are included in the single chip 20a. The magnetism sensitive sections 30, 31 are included in the single chip 20b different from the chip 20a. Thus, the physique of the stroke sensor 1 can be reduced and the performance and the characteristics of the magnetism sensitive sections 4, 5, 30, 31 can be equalized further.

Fifth Embodiment

Next, a stroke sensor 1 according to a fifth embodiment of the present invention will be described. As shown in FIG. 23, the stroke sensor 1 according to the fifth embodiment has only the two magnetism sensitive sections 4, 30 out of the magnetism sensitive sections 4, 5, 30, 31 included in the stroke sensor 1 of the fourth embodiment. Part (b) of FIG. 23 shows a cross section of the stroke sensor 1 of part (a) of FIG. 23 taken along the line C-C. With the construction, for example, when the stroke amount L is 0, correlations between the rotation angle θ and the magnetic flux densities obtained directly based on the electric outputs of the magnetism sensitive sections 4, 30 are similar to those of the characteristic lines η, ι shown in FIG. 13. Correlations between the stroke amount L and the magnetic flux densities obtained directly based on the electric outputs of the magnetism sensitive sections 4, 30 are similar to those of the characteristic lines γ, ε shown in FIGS. 17A to 19B, for example. Amplitudes thereof vary in accordance with the rotation angle θ.

Therefore, as for the sensing of the rotation angle θ, the correlation between the output value V(θ) and the rotation angle θ can be made into an ideal linear characteristic unaffected by the temperature characteristics of the magnetic flux and the temperature characteristics of the electric outputs by using Expression 22. Thus, highly accurate output value V(θ) can be obtained. The output value V(L) of the stroke amount L is calculated by selecting either one of the characteristic lines γ, ε shown in FIGS. 17A to 19B, for example.

Figure 24A:
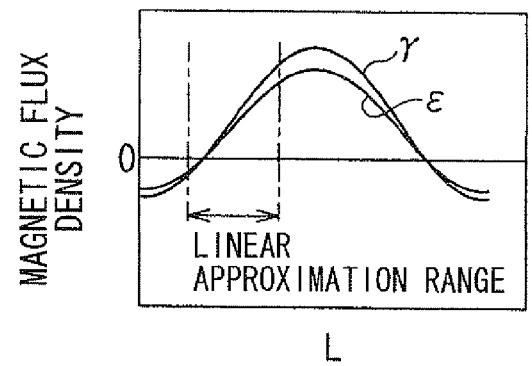
FIGS. 24A to 24C are characteristic diagrams each showing a correlation between a stroke amount and a magnetic flux density obtained directly based on an electric output of a magnetism sensitive section according to the fifth embodiment.
Figure 24B:
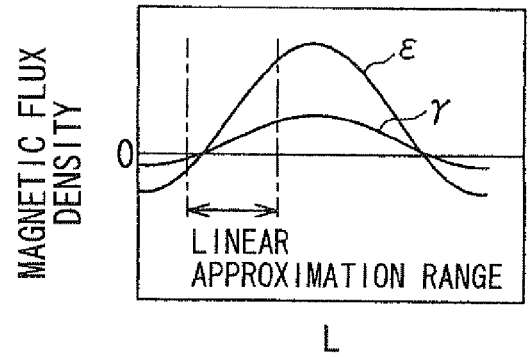
Figure 24C:
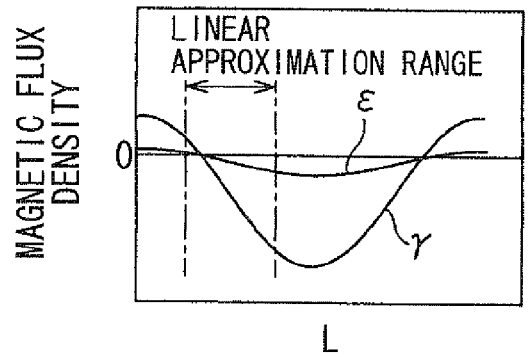

The characteristic lines γ, ε are the sine curves. Therefore, as shown in FIGS. 24A to 24C, a portion of the sine curve excluding a portion in which the characteristic line γ or ε curves in a convex shape or in a concave shape can be linearly-approximated to have a correlation of a linear function with respect to the stroke amount L. The output value V(L) is calculated based on the correlation obtained by the linear approximation.

When either one of the characteristic lines γ, ε is selected, as explained in the description of the fourth embodiment, the characteristic line providing the higher S/N ratio with respect to the output value V(L) is selected based on the rotation angle θ. That is, in the range where the rotation angle θ is smaller than θ1, the output value V(L) is calculated by selecting the characteristic line γ. In the range where the rotation angle θ is larger than θ1 and is smaller than θ2, the output value V(L) is calculated by selecting the characteristic line ε. In the range where the rotation angle θ is larger than θ2 and is smaller than θ3, the output value V(L) is calculated by selecting the characteristic line γ.

Figure 24D:
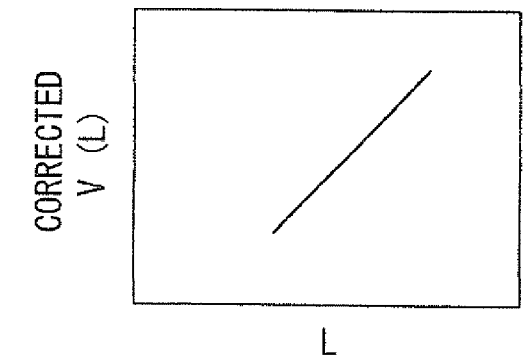
FIG. 24D is a characteristic diagram showing a correlation between the stroke amount and an output value concerning the stroke amount after correction according to the fifth embodiment.

In the range where the rotation angle θ is larger than θ3 and is smaller than θ4, the output value V(L) is calculated by selecting the characteristic line ε. In the range where the rotation angle θ is larger than θ4, the output value V(L) is calculated by selecting the characteristic line γ. The linear correlation between the magnetic flux density and the stroke amount L changes in accordance with the rotation angle θ. Therefore, by correcting the output value V(L) in accordance with the rotation angle θ, a linear characteristic unaffected by the rotation angle θ can be obtained between the output value V(L) and the stroke amount L as shown in FIG. 24D.

(Effects of Fifth Embodiment)

The stroke sensor 1 according to the fifth embodiment has only the two magnetism sensitive sections 4, 30 out of the magnetism sensitive sections 4, 5, 30, 31 included in the stroke sensor 1 of the fourth embodiment. Therefore, the sensing range for sensing the stroke amount L is narrowed as compared to the stroke sensor 1 of the fourth embodiment. However, as for the construction necessary for sensing the stroke amount L, the four magnetism sensitive sections 4, 5, 30, 31 can be reduced to the two magnetism sensitive sections 4, 30, thereby simplifying the construction.

Sixth Embodiment

Next, a rotation angle sensor 1A according to a sixth embodiment of the present invention will be described. The rotation angle sensor 1A according to the sixth embodiment is used only for sensing the rotation angle θ differently from the stroke sensors 1 of the first to fifth embodiments. The rotation angle sensor 1A has constructions of the magnets 2, 3 and the magnetism sensitive sections 4, 5, 30, 31 similar to those of the fourth embodiment. The rotation angle sensor 1A has functions of the first and second offset adjusting devices 17, 33 and the first to fourth inverse trigonometric function calculating devices 18, 34, 35, 36 similar to those of the fourth embodiment.

Figure 25:
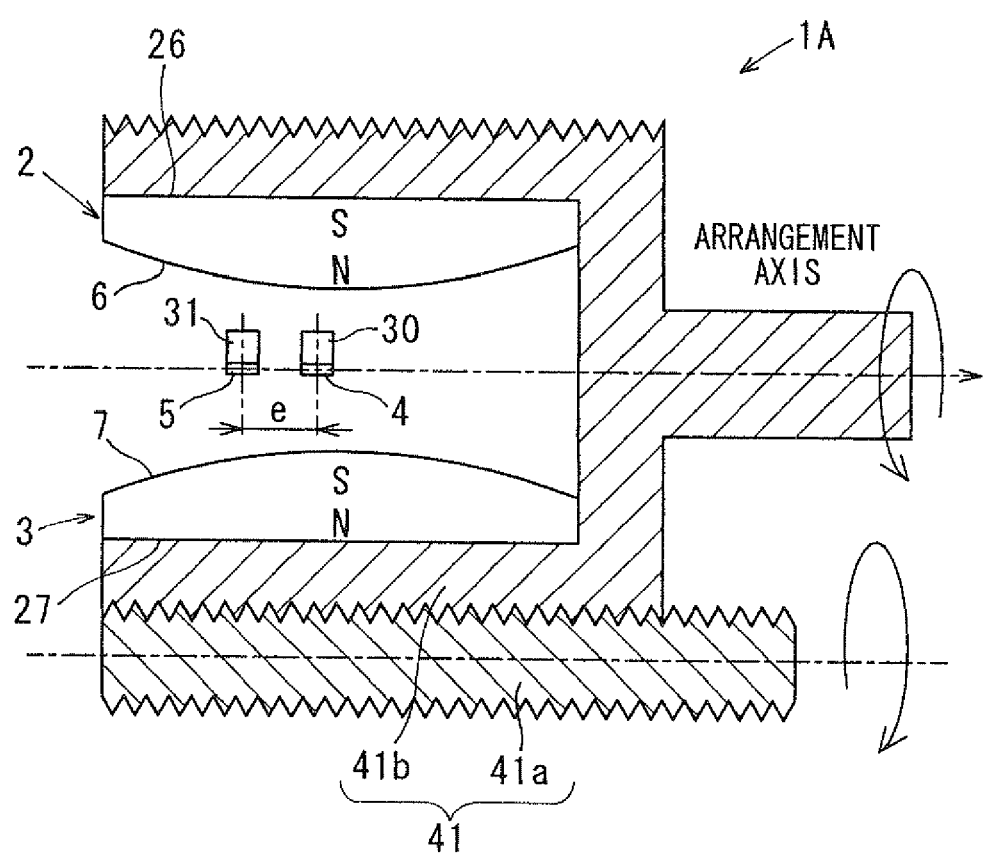
FIG. 25 is a schematic construction diagram showing a rotation angle sensor according to a sixth embodiment of the present invention.

As shown in FIG. 25, the rotation angle sensor 1A has a rotation-stroke conversion mechanism 41 that converts the rotation of the magnets 2, 3 into linear displacement to displace the magnets 2, 3 linearly in the longitudinal direction. For example, the rotation-stroke conversion mechanism 41 has a circular column body 41a having a helical tooth on its outer periphery and a cylindrical body 41b that has a helical tooth on its outer periphery and that defines a space on its inner peripheral side for accommodating the magnets 2, 3 and the magnetism sensitive sections 4, 5, 30, 31. The rotation-stroke conversion mechanism 41 is constructed by setting the circular column body 41a such that the circular column body 41a can rotate but cannot be displaced linearly in the arrangement axis direction and by setting the cylindrical body 41b such that the cylindrical body 41b can rotate and can be displaced linearly in the arrangement axis direction.

The magnetism sensitive sections 4, 5, 30, 31 are arranged on the arrangement axis in the space on the inner peripheral side of the cylindrical body 41b such that the arrangement of the magnetism sensitive sections 4, 5, 30, 31 is similar to that of the fourth embodiment. The magnets 2, 3 are fixed to an inner wall of the cylindrical body 41b such that the arrangement of the magnets 2, 3 is similar to that of the fourth embodiment. The magnets 2, 3 rotate and are displaced linearly in the arrangement axis direction integrally with the cylindrical body 41b. When the magnets 2, 3 rotate and are displaced linearly in the arrangement axis direction integrally with the cylindrical body 41b, the magnets 2, 3 rotate and are displaced linearly relative to the magnetism sensitive sections 4, 5, 30, 31.

Thus, the rotation angle $\theta$ of the magnets 2, 3 can be converted into the stroke amount L of the magnets 2, 3. Therefore, the stroke amount L can be expressed in the form of a function $L(\theta)$ that uses the rotation angle $\theta$ as a parameter by relating the stroke amount L to the rotation angle $\theta$ on a one-on-one basis. Therefore, the output value $V(L(\theta))$ concerning the stroke amount $L(\theta)$ can be calculated by the functions of the first and second offset adjusting devices 17, 33 and the first and third inverse trigonometric function calculating devices 18, 35. Hereafter, the output value $V(L(\theta))$ will be expressed as an output value $VL(\theta)$.

Figure 26:
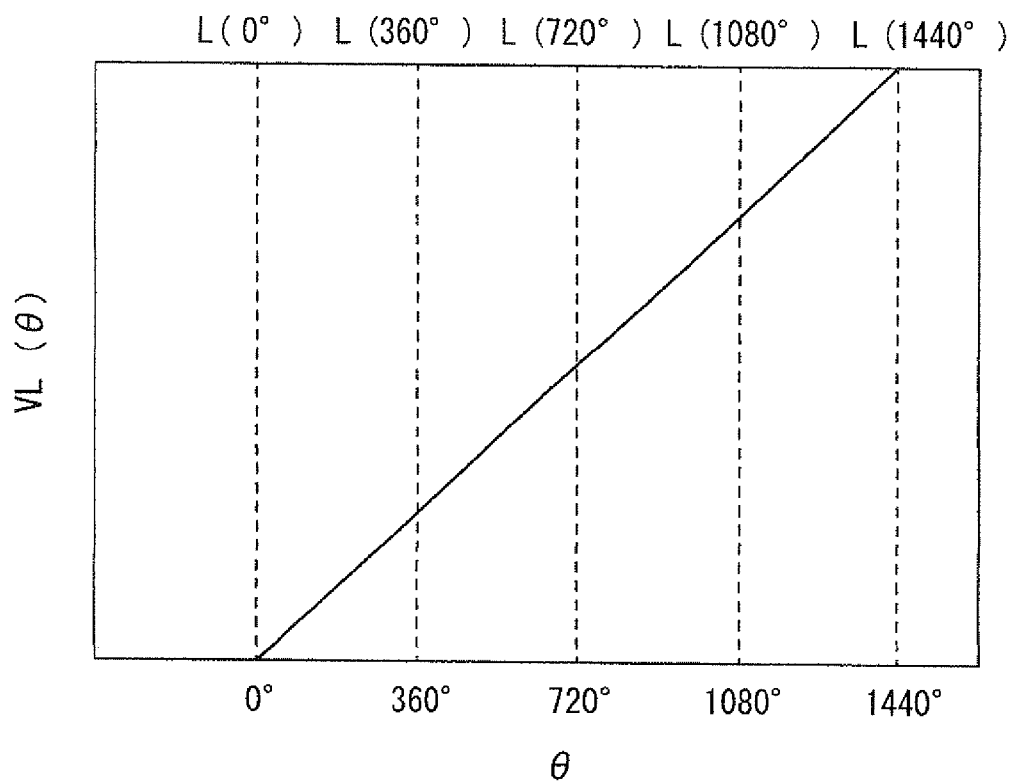
FIG. 26 is a characteristic diagram showing a correlation between a rotation angle and an output value concerning the rotation angle according to the sixth embodiment.

Therefore, as shown in FIG. 26, even when the rotation angle $\theta$ exceeds 360°, the output value $VL(\theta)$ concerning the rotation angle $\theta$ can be related to the rotation angle $\theta$ on a one-on-one basis. In addition, a correlation between the rotation angle $\theta$ and the output value $VL(\theta)$ can be made into an ideal linear characteristic unaffected by the temperature characteristics of the magnetic flux and the temperature characteristics of the electric outputs. As a result, even if the magnetic flux or the electric outputs fluctuate in accordance with the temperature, a highly accurate output value $VL(\theta)$ can be obtained concerning the rotation angle $\theta$ exceeding 360°.

The rotation angle $\theta$ is divided into an angle of integral multiple of 360° and an angle equal to or smaller than 360°. The angle of the integral multiple of 360° is roughly sensed from $VL(\theta)$. The angle equal to or smaller than 360° is sensed based on the output value $V(\theta)$ calculated by the functions of the second and fourth inverse trigonometric function calculating devices 34, 36. Thus, the rotation angle $\theta$ can be sensed with higher accuracy.

Figure 27:
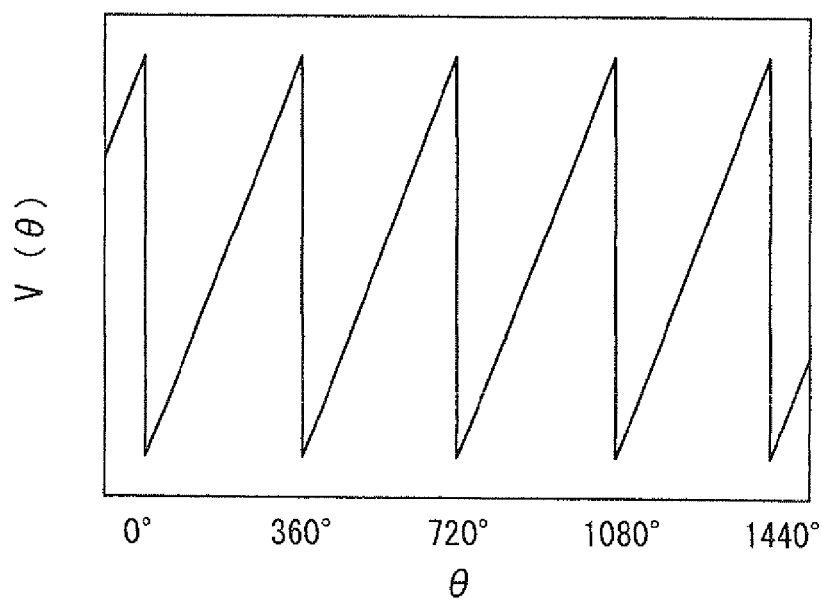
FIG. 27 is a characteristic diagram showing a correlation between the rotation angle and an output value concerning the rotation angle according to the sixth embodiment.

A correlation between the rotation angle $\theta$ and the output value $V(\theta)$ is as shown in FIG. 27 in the range including the range where the rotation angle $\theta$ exceeds 360°. According to the correlation shown in FIG. 27, the output value $V(\theta)$ returns to the minimum every time the rotation angle $\theta$ exceeds the angle of the integral multiple of 360°. The same waveform is repeated in the cycle of 360°.

The correlation in the range of the rotation angle $\theta$ from 0° to 360° is the same as the correlation shown in FIG. 16 and is an ideal linear characteristic unaffected by the temperature characteristics of the magnetic flux and the temperature characteristics of the electric outputs. Also a correlation in a range of the rotation angle $\theta$ from 360° to 720°, a correlation in a range of the rotation angle $\theta$ from 720° to 1080° and a correlation in a range of the rotation angle $\theta$ from 1080° to 1440° are ideal linear characteristics unaffected by the temperature characteristics of the magnetic flux and the temperature characteristics of the electric outputs like the correlation in the range from 0° to 360°. Also in the range where the rotation angle $\theta$ is larger than 1440°, the same waveform is repeated in the cycle of 360° likewise.

Therefore, the angle equal to or smaller than 360° is calculated with higher accuracy from the numerical value of the output value $V(\theta)$. The rotation angle $\theta$ can be sensed with higher accuracy by adding the angle equal to or smaller than 360° calculated from the output value $V(\theta)$ to the angle of the integral multiple of 360° roughly sensed from the output value $VL(\theta)$. The scheme of dividing the rotation angle $\theta$ into the angle of the integral multiple of 360° and the angle equal to or smaller than 360° and using the output value $V(\theta)$ having the higher accuracy concerning the angle equal to or smaller than 360° is effective when the stroke amount $L(\theta)$ is short and the resolution of the rotation angle $\theta$ is coarse.

When the output value $VL(\theta)$ is calculated, the combination that provides the higher S/N ratio may be selected and used out of the first and third combinations based on the angle equal to or smaller than 360° obtained from the output value $V(\theta)$. That is, when the output value $VL(\theta)$ is calculated, the group of the first offset adjusting device 17 and the first inverse trigonometric function calculating device 18 or the group of the second offset adjusting device 33 and the third inverse trigonometric function calculating device 35 may be selected and used based on the angle equal to or smaller than 360° obtained from the output value $V(\theta)$.

When the output value $V(\theta)$ is calculated, the combination that provides the higher S/N ratio may be selected and used out of the second and fourth combinations based on the stroke amount L. That is, when the output value $V(\theta)$ is calculated, either one of the second and fourth inverse trigonometric function calculating devices 34, 36 may be selected and used based on the stroke amount $L(\theta)$.

(Effects of Sixth Embodiment)

The rotation angle sensor 1A according to the sixth embodiment has the constructions of the magnets 2, 3 and the magnetism sensitive sections 4, 5, 30, 31 similar to those of the fourth embodiment. The rotation angle sensor 1A has functions of the first and second offset adjusting devices 17, 33 and the first to fourth inverse trigonometric function calculating devices 18, 34, 35, 36 similar to those of the fourth embodiment. The rotation angle sensor 1A has the rotation-stroke conversion mechanism 41 that converts the rotation of the magnets 2, 3 into the linear displacement to displace the magnets 2, 3 linearly in the longitudinal direction.

Thus, the rotation angle $\theta$ can be converted into the stroke amount $L(\theta)$. Therefore, even when the rotation angle $\delta$ exceeds 360°, the output value $VL(\theta)$ concerning the rotation angle $\delta$ can be related to the rotation angle $\theta$ on a one-on-one basis. In addition, the correlation between the rotation angle $\theta$ and the output value $VL(\theta)$ can be made into the ideal linear characteristic unaffected by the temperature characteristics of the magnetic flux and the temperature characteristics of the electric outputs. Therefore, even if the magnetic flux or the electric outputs fluctuate in accordance with the temperature, the rotation angle $\delta$ exceeding 360° can be sensed with high accuracy.

The rotation angle $\theta$ is divided into the angle of integral multiple of 360° and the angle equal to or smaller than 360°. The angle of the integral multiple of 360° is roughly sensed from $VL(\theta)$, and the angle equal to or smaller than 360° is sensed with higher accuracy. Thus, the rotation angle $\theta$ can be sensed with higher accuracy.

The output value $V(\theta)$ is calculated by selecting either one of the second and fourth combinations and by operating either one of the second and fourth inverse trigonometric function calculating devices 34, 36 in accordance with the selected combination. Thus, the angle equal to or smaller than 360° can be calculated as the highly accurate numerical value unaffected by the temperature characteristics of the magnetic flux and the temperature characteristics of the electric outputs.

Therefore, even if the magnetic flux or the electric outputs fluctuate in accordance with the temperature, the rotation angle $\theta$ exceeding 360° can be sensed with high accuracy. The rotation-stroke conversion mechanism 41 is not limited to the type of the sixth embodiment. Alternatively, for example, the rotation-stroke conversion mechanism 41 may employ a rack-and-pinion type. If the cylindrical body 41*b* is provided by a magnetic body, the peripheries 26, 27 can be covered by the magnetic body. Accordingly, robustness against the disturbance magnetic field can be improved.

(Modifications)

Figure 28:
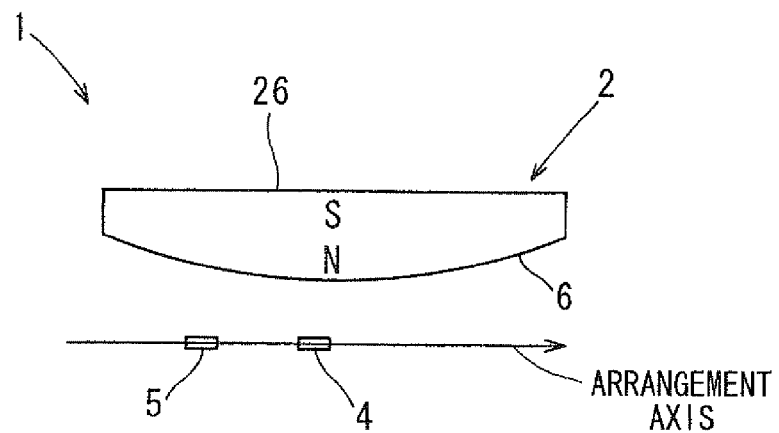
FIG. 28 is a schematic construction diagram showing a stroke sensor of a modified example of the present invention.

In the stroke sensor 1 or the rotation angle sensor 1A according to the first to sixth embodiments, the movable members are constituted by the two magnets 2, 3. Alternatively, the movable member may be constituted by either one of the magnets 2, 3. For example, the movable member may be constituted by only the magnet 2 as shown in FIG. 28. In this case, the physique of the stroke sensor 1 reduces and the cost reduces although the robustness against positional deviation lowers.

Figure 29:
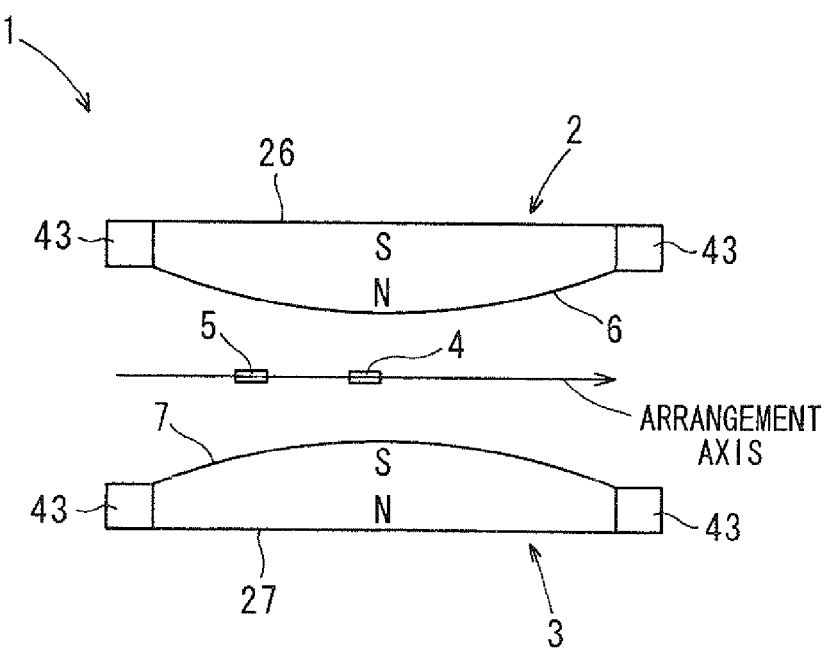
FIG. 29 is a schematic construction diagram showing a stroke sensor of another modified example of the present invention.

As shown in FIG. 29, yokes 43 may be attached to both ends of the two magnets 2, 3 in the longitudinal direction. The structure attaching the yokes 43 can be also applied to the case where the movable member is constituted by either one of the magnets 2, 3.

In the stroke sensor 1 according to the third embodiment, both of the peripheries of the magnets 2, 3 are covered by the magnetic body 28. Alternatively, only one of the peripheries 26, 27 may be covered by the magnetic body 28. The structure covering the peripheries 26, 27 with the magnetic body 28 can be also applied to the case where the movable member is constituted by either one of the magnets 2, 3.

In the stroke sensor 1 or the rotation angle sensor 1A according to the first to sixth embodiments, the magnetism sensitive section facing peripheral edges of the magnets 2, 3 are the swelling end edges 6, 7 swelling in the circular arc shapes. The shapes of the swelling end edges 6, 7 are not limited to such the shapes. For example, the shape of each of the swelling end edges 6, 7 may be formed in the shape of a part of a quadratic curve (for example, elliptic arc) other than the circular arc. Also in this case, the correlation between the magnetic flux density on the arrangement axis and the coordinate of the arrangement axis can be substantially coincided with the sine curve.

Instead of convexing the magnetism sensitive section facing peripheral edge toward the arrangement axis, the magnetism sensitive section facing peripheral edge may be concaved away from the arrangement axis such that the magnetism sensitive section facing peripheral edge becomes a part of a quadratic curve. Furthermore, the shape of the magnetism sensitive section facing peripheral edge is not limited to a part of the quadratic curve as long as the correlation between the magnetic flux density on the arrangement axis and the coordinate of the arrangement axis substantially coincides with the sine curve. The above-described various shapes of the magnetism sensitive section facing peripheral edge can be also applied to the case where the movable member is constituted by either one of the magnets 2, 3.

In the stroke sensor 1 or the rotation angle sensor 1A according to the first to sixth embodiments, the movable members are constituted by the two magnets 2, 3, and the fixed members are constituted by the magnetism sensitive sections 4, 5 and the like. The constructions of the movable members and the fixed members are not limited to the above. That is, any construction can be employed as long as the magnets 2, 3 and the magnetism sensitive sections 4, 5 can be displaced relative to each other. For example, the magnets 2, 3 may constitute the fixed members and the magnetism sensitive sections 4, 5 may constitute the movable members.

In the stroke sensor 1 according to the first to third embodiments, the magnetism sensitive sections 4, 5 are arranged on the arrangement axis to be distant from each other by the predetermined distance d/2, which is one fourth of the cycle 2d of the sine curve as the correlation between the magnetic flux density on the arrangement axis and the coordinate of the arrangement axis. In the stroke sensor 1 or the rotation angle sensor 1A according to the fourth to sixth embodiments, the magnetism sensitive sections 4, 5 are arranged on the arrangement axis to be distant from each other by the distance a shorter than the distance d/2, and also the magnetism sensitive sections 30, 31 are arranged on the arrangement axis to be distant from each other by the distance e. Alternatively, the distance between the magnetism sensitive sections 4, 5 may be set at the distance e in the stroke sensor 1 according to the first to third embodiments.

In the stroke sensor 1 or the rotation angle sensor 1A according to the fourth to sixth embodiments, the distance between the magnetism sensitive sections 4, 5 may be set at the distance d12, and the distance between the magnetism sensitive sections 30, 31 may be set at the distance d/2. In the stroke sensor 1 or the rotation angle sensor 1A according to the first to sixth embodiments, the distance between the magnetism sensitive sections 4, 5 may be set at a distance longer than the distance d/2, and the distance between the magnetism sensitive sections 30, 31 may be set at a distance longer than the distance d/2.

In the stroke sensor 1 or the rotation angle sensor 1A according to the fourth to sixth embodiments, the magnetism sensitive sections 4, 30 are arranged to form the angle θc smaller than 90° between the magnetism sensitive surfaces thereof, and the magnetism sensitive sections 5, 31 are arranged to form the angle θc between the magnetism sensitive surfaces thereof. Alternatively, the magnetism sensitive sections 4, 30 may be arranged to form the right angle between the magnetism sensitive surfaces thereof, and the magnetism sensitive sections 5, 31 may be arranged to form the right angle between the magnetism sensitive surfaces thereof. Alternatively, the magnetism sensitive sections 4, 30 may be arranged to form an angle larger than 90° between the magnetism sensitive surfaces thereof, and the magnetism sensitive sections 5, 31 may be arranged to form an angle larger than 90° between the magnetism sensitive surfaces thereof.

When the magnetism sensitive sections 4, 30 are arranged to form the right angle between the magnetism sensitive surfaces thereof or when the magnetism sensitive sections 5, 31 are arranged to form the right angle between the magnetism sensitive surfaces thereof, the characteristic lines ι, λ can be regarded as cosine functions by regarding the characteristic lines η, κ as sine functions. Therefore, the output value V(θ) can be calculated by using simpler numerical expressions. Therefore, the arithmetic load for sensing the rotation angle θ can be reduced.

The stroke sensor 1 or the rotation angle sensor 1A according to the fourth or sixth embodiment has the four magnetism sensitive sections 4, 5, 30, 31. Alternatively, the stroke sensor 1 or the rotation angle sensor 1A may be constituted by using only three out of the four magnetism sensitive sections 4, 5, 30, 31. For example, the stroke sensor 1 or the rotation angle sensor 1A may be constituted by using the three magnetism sensitive sections 4, 5, 30.

In the stroke sensor 1 or the rotation angle sensor 1A according to the fourth or sixth embodiment, the magnetism sensitive sections 4, 5, 30, 31 are the Hall elements. The magnetism sensitive sections 4, 5 are included in the chip 20*a*. The magnetism sensitive sections 30, 31 are included in the chip 20*b*. The functions of the first and second offset adjusting devices 17, 33 and the first to fourth inverse trigonometric function calculating devices 18, 34, 35, 36 are provided in the DSP 14 of the arithmetic circuit 13 provided separately from the chips 20*a*, 20*b*. The constructions of the magnetism sensitive sections 4, 5, 30, 31, the first and second offset adjusting devices 17, 33 and the first to fourth inverse trigonometric function calculating devices 18, 34, 35, 36 are not limited to the above.

For example, among the magnetism sensitive sections 4, 5, 30, 31, the magnetism sensitive sections 4, 30 may be included in a first chip, and the magnetism sensitive sections 5, 31 may be included in a second chip different from the first chip. Alternatively, the magnetism sensitive sections 4, 5, 30, 31 may be provided by individual Hall ICs respectively. In addition, for example, two DSPs may be provided. In this case, the first DSP may have the functions of the first and second offset adjusting devices 17, 33 and the first and third inverse trigonometric function calculating devices 18, 35, and the second DSP may have the functions of the second and fourth inverse trigonometric function calculating devices 34, 36.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A stroke sensor that senses a linear displacement amount of a sensed body displaced linearly, the stroke sensor comprising:
   a magnet magnetized in a direction perpendicular to a longitudinal direction of the magnet; and
   two magnetism sensitive sections arranged parallel to the longitudinal direction for sensing a magnetic flux formed by the magnet and for outputting electric outputs respectively, wherein
   the two magnetism sensitive sections are arranged along an arrangement axis parallel to the longitudinal direction and are arranged such that magnetism sensitive surfaces thereof face in the same direction, which is parallel to a cross-section direction of the magnet and perpendicular to the longitudinal direction of the magnet,
   the magnet is displaced in the longitudinal direction relative to the two magnetism sensitive sections in accordance with the linear displacement of the sensed body and has a magnetism sensitive section facing peripheral edge facing the arrangement axis, along the direction of the magnetization, and
   the magnetism sensitive section facing peripheral edge is formed in a curved shape such that a correlation between a magnetic flux density on the arrangement axis and a coordinate of the arrangement axis substantially coincides with a sine curve.

2. The stroke sensor as in claim 1, further comprising:
   another magnet that has a magnetism sensitive section facing peripheral edge in the same shape as the magnetism sensitive section facing peripheral edge of the magnet, wherein
   the another magnet is magnetized such that its polarity on its magnetism sensitive section facing peripheral edge side is opposite to a polarity of the magnet on the magnetism sensitive section facing peripheral edge side of the magnet, and
   the another magnet is displaced together with the magnet relative to the two magnetism sensitive sections while maintaining a reflectional symmetry between the magnetism sensitive section facing peripheral edges of the magnet and the another magnet across the arrangement axis.

3. The stroke sensor as in claim 2, further comprising:
   another magnetism sensitive section that is different from the two magnetism sensitive sections and that is arranged at substantially the same position as at least certain one of the two magnetism sensitive sections on the arrangement axis, wherein
   the another magnetism sensitive section has a magnetism sensitive surface not parallel to the magnetism sensitive surface of the certain one of the two magnetism sensitive sections,
   the sensed body is displaced linearly and rotates, and
   the magnet and the another magnet are displaced in the longitudinal direction relative to the two magnetism sensitive sections and the another magnetism sensitive section and rotate in accordance with the rotation of the sensed body relative to the two magnetism sensitive sections and the another magnetism sensitive section.

4. The stroke sensor as in claim 3, further comprising:
   yet another magnetism sensitive section that is different from the another magnetism sensitive section and that is arranged at substantially the same position as the other one of the two magnetism sensitive sections on the arrangement axis, wherein
   the yet another magnetism sensitive section has a magnetism sensitive surface, which is not parallel to the magnetism sensitive surface of the other one of the two magnetism sensitive sections and which is in the same direction as the magnetism sensitive surface of the another magnetism sensitive section.

5. The stroke sensor as in claim 4, wherein
   the stroke sensor senses the linear displacement amount of the sensed body and a rotation angle of the sensed body,
   a combination of an electric output obtained from the certain one of the two magnetism sensitive sections and an electric output obtained from the other one of the two magnetism sensitive sections is defined as a first combination,
   a combination of the electric output obtained from the certain one of the two magnetism sensitive sections and an electric output obtained from the another magnetism sensitive section is defined as a second combination,
   a combination of the electric output obtained from the another magnetism sensitive section and an electric output obtained from the yet another magnetism sensitive section is defined as a third combination,
   a combination of the electric output obtained from the other one of the two magnetism sensitive sections and the electric output obtained from the yet another magnetism sensitive section is defined as a fourth combination,
   the stroke sensor selects and uses a combination that provides the higher sensed magnetic flux density between the first and third combinations based on the rotation angle to sense the linear displacement amount, and
   the stroke sensor selects and uses a combination that provides the higher sensed magnetic flux density between the second and fourth combinations based on the linear displacement amount to sense the rotation angle.

6. The stroke sensor as in claim 1, wherein
   the two magnetism sensitive sections are arranged on the arrangement axis to be distant from each other by a distance of one fourth of a cycle of the sine curve.

7. The stroke sensor as in claim 1, further comprising:
another magnet that has a magnetism sensitive section facing peripheral edge in the same shape as the magnetism sensitive section facing peripheral edge of the magnet, wherein the another magnet is magnetized such that its polarity on its magnetism sensitive section facing peripheral edge side is opposite to a polarity of the magnet on the magnetism sensitive section facing peripheral edge side of the magnet and the another magnet is displaced together with the magnet relative to the two magnetism sensitive sections while maintaining a reflectional symmetry between the magnetism sensitive section facing peripheral edges of the magnet and the another magnet across the arrangement axis; and
another magnetism sensitive section that is different from the two magnetism sensitive sections and that is arranged at substantially the same position as at least certain one of the two magnetism sensitive sections on the arrangement axis, wherein
the another magnetism sensitive section has a magnetism sensitive surface not parallel to the magnetism sensitive surface of the certain one of the two magnetism sensitive sections,
the sensed body is displaced linearly and rotates,
the magnet and the another magnet are displaced in the longitudinal direction relative to the two magnetism sensitive sections and the another magnetism sensitive section and rotate in accordance with the rotation of the sensed body relative to the two magnetism sensitive sections and the another magnetism sensitive section, and
the magnetism sensitive surface of the certain one of the two magnetism sensitive sections and the magnetism sensitive surface of the another magnetism sensitive section form a right angle.

8. The stroke sensor as in claim 7, further comprising:
yet another magnetism sensitive section that is different from the another magnetism sensitive section and that is arranged at substantially the same position as the other one of the two magnetism sensitive sections on the arrangement axis, wherein
the yet another magnetism sensitive section has a magnetism sensitive surface that is not parallel to the magnetism sensitive surface of the other one of the two magnetism sensitive sections and that is in the same direction as the magnetism sensitive surface of the another magnetism sensitive section, and
the magnetism sensitive surface of the other one of the two magnetism sensitive sections and the magnetism sensitive surface of the yet another magnetism sensitive section form a right angle.

9. The stroke sensor as in claim 1, further comprising:
a magnetic body covering a peripheral edge of the magnet on a side opposite to the magnetism sensitive section facing peripheral edge with respect to the magnetization direction.

10. The stroke sensor as in claim 9, further comprising:
another magnet that has a magnetism sensitive section facing peripheral edge in the same shape as the magnetism sensitive section facing peripheral edge of the magnet, wherein the another magnet is magnetized such that its polarity on its magnetism sensitive section facing peripheral edge side is opposite to a polarity of the magnet on the magnetism sensitive section facing peripheral edge side of the magnet and the another magnet is displaced together with the magnet relative to the two magnetism sensitive sections while maintaining a reflectional symmetry between the magnetism sensitive section facing peripheral edges of the magnet and the another magnet across the arrangement axis, wherein
the magnetic body covers a peripheral edge of the another magnet on a side opposite to the magnetism sensitive section facing peripheral edge with respect to the magnetization direction.

11. The stroke sensor as in claim 1, wherein
the two magnetism sensitive sections are Hall elements and are provided by a single chip.

12. The stroke sensor as in claim 11, further comprising:
another magnet that has a magnetism sensitive section facing peripheral edge in the same shape as the magnetism sensitive section facing peripheral edge of the magnet, wherein the another magnet is magnetized such that its polarity on its magnetism sensitive section facing peripheral edge side is opposite to a polarity of the magnet on the magnetism sensitive section facing peripheral edge side of the magnet;
another magnetism sensitive section that is different from the two magnetism sensitive sections and that is arranged at substantially the same position as at least certain one of the two magnetism sensitive sections on the arrangement axis, wherein the another magnetism sensitive section has a magnetism sensitive surface not parallel to the magnetism sensitive surface of the certain one of the two magnetism sensitive sections; and
yet another magnetism sensitive section that is different from the another magnetism sensitive section and that is arranged at substantially the same position as the other one of the two magnetism sensitive sections on the arrangement axis, wherein the yet another magnetism sensitive section has a magnetism sensitive surface, which is not parallel to the magnetism sensitive surface of the other one of the two magnetism sensitive sections and which is in the same direction as the magnetism sensitive surface of the another magnetism sensitive section, wherein
the sensed body is displaced linearly and rotates,
the magnet and the another magnet are displaced in the longitudinal direction and rotate relative to the two magnetism sensitive sections, the another magnetism sensitive section and the yet another magnetism sensitive section in accordance with the linear displacement and the rotation of the sensed body while maintaining a reflectional symmetry between the magnetism sensitive section facing peripheral edges of the magnet and the another magnet across the arrangement axis, and
the another magnetism sensitive section and the yet another magnetism sensitive section are Hall elements and are provided by a single chip.

13. The stroke sensor as in claim 4, wherein
the magnet and the another magnet are displaced in the longitudinal direction and rotate relative to the two magnetism sensitive sections, the another magnetism sensitive section and the yet another magnetism sensitive section in accordance with the linear displacement and the rotation of the sensed body while maintaining the reflectional symmetry between the magnetism sensitive section facing peripheral edges of the magnet and the another magnet across the arrangement axis,
the two magnetism sensitive sections, the another magnetism sensitive section and the yet another magnetism sensitive section are Hall elements,
the certain one of the two magnetism sensitive sections and the another magnetism sensitive section are provided by a single chip, and the other one of the two magnetism sensitive sections and the yet another magnetism sensitive section are provided by another single chip.

14. The stroke sensor as in claim 1, further comprising: yokes fixed to both longitudinal ends of the magnet.

15. The stroke sensor as in claim 14, further comprising: another magnet that has a magnetism sensitive section facing peripheral edge in the same shape as the magnetism sensitive section facing peripheral edge of the magnet, wherein the another magnet is magnetized such that its polarity on its magnetism sensitive section facing peripheral edge side is opposite to a polarity of the magnet on the magnetism sensitive section facing peripheral edge side of the magnet and the another magnet is displaced together with the magnet relative to the two magnetism sensitive sections while maintaining a reflectional symmetry between the magnetism sensitive section facing peripheral edges of the magnet and the another magnet across the arrangement axis; and
yokes fixed to both longitudinal ends of the another magnet.

16. A stroke sensor that senses a linear displacement amount of a sensed body, which is displaced linearly and rotates, the stroke sensor comprising:
two magnets arranged such that longitudinal directions thereof are parallel to each other and such that the magnets face each other in a cross-section direction perpendicular to the longitudinal direction; and
two magnetism sensitive sections arranged such that the two magnetism sensitive sections are interposed between the two magnets in the cross-section direction at the same position with respect to the longitudinal direction, wherein
the two magnetism sensitive sections are arranged such that magnetism sensitive surfaces thereof are not parallel to each other,
each magnet has a magnetism sensitive section facing peripheral edge that is one of both end peripheral edges of the magnet in the cross-section direction and that faces the two magnetism sensitive sections,
the two magnets are magnetized in the cross-section direction respectively and arranged such that the magnetism sensitive section facing peripheral edges of the two magnets have opposite polarities,
the magnetism sensitive section facing peripheral edges of the magnets are formed in substantially the same curved shape such that a correlation between a magnetic flux density on an arrangement axis and a coordinate of the arrangement axis substantially coincides with a sine curve and such that the magnetism sensitive section facing peripheral edges provide a reflectional symmetry therebetween across the arrangement axis, the arrangement axis including the position where the two magnetism sensitive sections are positioned and extending parallel to the longitudinal direction, and
the two magnets are displaced in the longitudinal direction relative to the two magnetism sensitive sections in accordance with the linear displacement of the sensed body and rotate relative to the two magnetism sensitive sections in accordance with the rotation of the sensed body while maintaining the reflectional symmetry between the magnetism sensitive section facing peripheral edges of the two magnets.

17. stroke sensor as in claim 16, wherein
the stroke sensor senses the linear displacement amount of the sensed body and senses a rotation angle of the sensed body, and
the stroke sensor corrects the linear displacement amount according to the rotation angle.

18. A rotation angle sensor that senses a rotation angle of a rotating sensed body, the rotation angle sensor comprising:
two magnets arranged such that longitudinal directions thereof are parallel to each other and such that the magnets face each other in a cross-section direction perpendicular to the longitudinal direction, the two magnets rotating in accordance with the rotation of the sensed body;
three magnetism sensitive sections arranged to be interposed between the two magnets in the cross-section direction; and
a rotation-stroke conversion mechanism that converts the rotation of the two magnets into linear displacement to displace the two magnets linearly in the longitudinal direction, wherein
certain two of the three magnetism sensitive sections are arranged at substantially the same position with respect to the longitudinal direction such that magnetism sensitive surfaces of the certain two magnetism sensitive sections are not parallel to each other,
the other one of the three magnetism sensitive sections is arranged separately from the certain two magnetism sensitive sections on an arrangement axis, which includes the position where the certain two magnetism sensitive sections are arranged and which extends parallel to the longitudinal direction,
a magnetism sensitive surface of the other one of the three magnetism sensitive sections is in the same direction as a magnetism sensitive surface of certain one of the certain two magnetism sensitive sections,
each magnet has a magnetism sensitive section facing peripheral edge that is one of both end peripheral edges of the magnet in the cross-section direction and that faces the three magnetism sensitive sections,
the two magnets are magnetized in the cross-section direction respectively such that the magnetism sensitive section facing peripheral edges of the two magnets have opposite polarities,
the magnetism sensitive section facing peripheral edges are formed in substantially the same curved shape such that a correlation between a magnetic flux density on the arrangement axis and a coordinate of the arrangement axis substantially coincides with a sine curve and such that the magnetism sensitive section facing peripheral edges provide a reflectional symmetry across the arrangement axis, and
the two magnets are displaced linearly in the longitudinal direction and rotate relative to the three magnetism sensitive sections in accordance with the rotation of the sensed body while maintaining the reflectional symmetry between the magnetism sensitive section facing peripheral edges.

19. The rotation angle sensor as in claim 18, wherein
the rotation angle sensor divides the rotation angle into an angle of integral multiple of 360° and an angle equal to or smaller than 360°,
the rotation angle sensor senses the angle of the integral multiple of 360° based on a linear displacement amount obtained by converting the rotation of the two magnets by the rotation-stroke conversion mechanism, and
the rotation angle sensor senses the angle equal to or smaller than 360° by using electric outputs obtained from the certain two magnetism sensitive sections.

20. The rotation angle sensor as in claim 18, further comprising:
   another magnetism sensitive section different from the three magnetism sensitive sections, wherein
   the another magnetism sensitive section is arranged at the same position as the other one of the three magnetism sensitive sections on the arrangement axis, and
   a magnetism sensitive surface of the another magnetism sensitive section is in the same direction as a magnetism sensitive surface of the other one of the certain two magnetism sensitive sections.

* * * * *